US012244534B2

(12) United States Patent
Zhang et al.

(10) Patent No.: US 12,244,534 B2
(45) Date of Patent: Mar. 4, 2025

(54) CHANNEL STATE INFORMATION PROCESSING CRITERIA

(71) Applicant: QUALCOMM Incorporated, San Diego, CA (US)

(72) Inventors: Yu Zhang, San Diego, CA (US); Chenxi Hao, Beijing (CN); Alexei Yurievitch Gorokhov, San Diego, CA (US); Peter Gaal, San Diego, CA (US); Alexandros Manolakos, Escondido, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 17/753,199

(22) PCT Filed: Aug. 27, 2020

(86) PCT No.: PCT/CN2020/111719
§ 371 (c)(1),
(2) Date: Feb. 23, 2022

(87) PCT Pub. No.: WO2021/037137
PCT Pub. Date: Mar. 4, 2021

(65) Prior Publication Data
US 2022/0278806 A1  Sep. 1, 2022

(51) Int. Cl.
*H04L 5/00* (2006.01)
*H04B 7/06* (2006.01)
(Continued)

(52) U.S. Cl.
CPC ......... *H04L 5/0053* (2013.01); *H04B 7/0626* (2013.01); *H04W 72/044* (2013.01); *H04W 72/23* (2023.01)

(58) Field of Classification Search
CPC ..... H04L 5/0053; H04L 5/001; H04L 5/0057; H04L 5/0098; H04B 7/0626;
(Continued)

(56) References Cited

U.S. PATENT DOCUMENTS 10,015,691 B2   7/2018  Damnjanovic et al.
2019/0141546 A1  5/2019  Zhou et al.
(Continued)

FOREIGN PATENT DOCUMENTS

CN    109922526 A    6/2019
WO    2016061382      4/2016

OTHER PUBLICATIONS

3GPP TS 38.214, "3rd Generation Partnership Project; Technical Specification Group Radio Access Network; NR; Physical Layer Procedures for Data (Release 15)", 3GPP Standard, Technical Specification, 3GPP TS 38.214, 3rd Generation Partnership Project (3GPP), Mobile Competence Centre, 650, Route Des Lucioles, F-06921, Sophia-Antipolis Cedex, France, vol. RAN WG1, No., V15.6.0, Jun. 24, 2019 (Jun. 24, 2019), XP051754328, pp. 1-105, [Retrieved on Jun. 24, 2019] Section 5.2, chapter 5.1.5, Section 5.1.2.2, p. 15-p. 16.

(Continued)

*Primary Examiner* — Ricky Q Ngo
*Assistant Examiner* — Kabir U Jahangir
(74) *Attorney, Agent, or Firm* — Patterson + Sheridan, L.L.P./Qualcomm

(57) ABSTRACT

Some aspects of the present disclosure provide channel state information (CSI) processing criteria. A method that may be performed by a user equipment (UE) generally includes receiving, from a base station via a first bandwidth part (BWP), control signaling that triggers reporting at least one of a first channel state information (CSI) report associated with the first BWP or a second CSI report associated with a second BWP that is non-active, determining, based on an indication of an active downlink (DL) BWP change, at least one occupation time of one or more CSI processing units (CPUs) associated with the first CSI report or the second CSI report, and taking one or more actions based at least in part on the at least one occupation time.

26 Claims, 16 Drawing Sheets

(51) Int. Cl.
*H04W 72/044* (2023.01)
*H04W 72/23* (2023.01)

(58) Field of Classification Search
CPC ............... H04W 72/044; H04W 72/23; H04W 24/10; H04W 72/0453
See application file for complete search history.

(56) References Cited

U.S. PATENT DOCUMENTS

| | | | |
|---|---|---|---|
| 2019/0149213 A1 | 5/2019 | Zhou et al. | |
| 2019/0150172 A1 | 5/2019 | Ang et al. | |
| 2019/0215781 A1* | 7/2019 | Jeon | H04W 76/32 |
| 2020/0107319 A1* | 4/2020 | Bagheri | H04L 5/0053 |
| 2021/0068015 A1* | 3/2021 | Yang | H04W 72/0446 |
| 2022/0256458 A1* | 8/2022 | Noh | H04W 52/0229 |
| 2022/0278802 A1* | 9/2022 | Noh | H04B 7/06 |
| 2022/0295528 A1* | 9/2022 | Xue | H04L 5/0098 |
| 2022/0303999 A1* | 9/2022 | Chung | H04L 5/0064 |

OTHER PUBLICATIONS

Ericsson: "Summary of Views on CSI Reporting v3", 3GPP TSG-RAN WG1 Meeting #95, R1-1814088, Spokane, USA, Nov. 12-16, 2018, Nov. 15, 2018 (Nov. 15, 2018), pp. 1-24, Sections 6, 10.
International Search Report and Written Opinion—PCT/CN2019/102879—ISAEPO—May 27, 2020.
International Search Report and Written Opinion—PCT/CN2020/111719—ISA/EPO—Dec. 7, 2020.
Samsung: "Discussions on CPU Occupancy for Semi-Persistent CSI Report", 3GPP TSG RAN WG1 Meeting #98, R1-1908454, Prague, CZ, Aug. 26-30, 2019, Aug. 16, 2019 (Aug. 16, 2019), 3 Pages, Section 2.

* cited by examiner

CHANNEL STATE INFORMATION PROCESSING CRITERIA

CROSS-REFERENCE TO RELATED APPLICATION

This application is a national stage application under 35 U.S.C. 371 of PCT/CN2020/111719, filed Aug. 27, 2020, which claims benefit of and priority to International Application No. PCT/CN2019/102879, filed Aug. 27, 2019, both of which are herein incorporated by reference in their entirety for all applicable purposes.

TECHNICAL FIELD

Aspects of the present disclosure relate to wireless communications, and more particularly, to channel state information (CSI) processing criteria.

DESCRIPTION OF THE RELATED TECHNOLOGY

Wireless communication systems are widely deployed to provide various telecommunication services such as telephony, video, data, messaging, broadcasts, etc. These wireless communication systems may employ multiple-access technologies capable of supporting communication with multiple users by sharing available system resources (such as, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (such as, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

In some wireless communication networks (such as, 5G NR), bandwidth parts (BWPs) provide a flexible framework for dividing frequency-domain resources in a given carrier. A user equipment may be configured with multiple BWPs where only one of the BWPs is active at a given time. In some cases, the UE may be switched from one BWP to another BWP dynamically (such as, triggered by downlink control information (DCI)). Under some channel state information (CSI) processing criteria, the UE may not take into account an indication of an active BWP change, which may prevent the UE from performing some CSI calculations, even though the UE actually has processing resources available to perform those CSI calculations.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include CSI feedback that may take into account an active bandwidth part change.

One innovative aspect of the subject matter described in this disclosure can be implemented in a method for wireless communication, for example, by a user equipment. The method generally includes receiving, from a base station via a first bandwidth part (BWP), control signaling that triggers reporting at least one of a first channel state information (CSI) report associated with the first BWP or a second CSI report associated with a second BWP that is non-active, determining, based on an indication of an active downlink (DL) BWP change, at least one occupation time of one or more CSI processing units (CPUs) associated with the first CSI report or the second CSI report, and taking one or more actions based at least in part on the at least one occupation time.

One innovative aspect of the subject matter described in this disclosure can be implemented in a method for wireless communication, for example, by a base station. The method generally includes generating a channel state information (CSI) trigger state that triggers reporting at least one of a first CSI report associated with a first bandwidth part (BWP) that is active or a second CSI report associated with a second BWP that is non-active, determining, based on an active downlink (DL) BWP change, at least one occupation time of one or more CSI processing units (CPUs) associated with the first CSI report or the second CSI report, and transmitting, to a user equipment (UE), control signaling indicating the CSI trigger state based on the determination.

One innovative aspect of the subject matter described in this disclosure can be implemented in an apparatus. The apparatus generally includes a receiver configured to receive, from a base station via a first bandwidth part (BWP), control signaling that triggers reporting at least one of a first channel state information (CSI) report associated with the first BWP or a second CSI report associated with a second BWP that is non-active. The apparatus also includes a processor configured to determine, based on an indication of an active downlink (DL) BWP change, at least one occupation time of one or more CSI processing units (CPUs) associated with the first CSI report or the second CSI report, and take one or more actions based at least in part on the at least one occupation time. The processor further includes a memory coupled to the processor.

One innovative aspect of the subject matter described in this disclosure can be implemented in an apparatus. The apparatus generally includes a processor configured to generate a channel state information (CSI) trigger state that triggers reporting at least one of a first CSI report associated with a first bandwidth part (BWP) that is active or a second CSI report associated with a second BWP that is non-active, and determine, based on an active downlink (DL) BWP change, at least one occupation time of one or more CSI processing units (CPUs) associated with the first CSI report or the second CSI report. The apparatus also includes a transmitter configured to transmit, to a user equipment (UE), control signaling indicating the CSI trigger state based on the determination. The apparatus further includes a memory coupled to the processor.

One innovative aspect of the subject matter described in this disclosure can be implemented in an apparatus. The apparatus generally includes means for receiving, from a base station via a first bandwidth part (BWP), control signaling that triggers reporting at least one of a first channel state information (CSI) report associated with the first BWP or a second CSI report associated with a second BWP that is non-active. The apparatus also includes means for determining, based on an indication of an active downlink (DL) BWP change, at least one occupation time of one or more CSI processing units (CPUs) associated with the first CSI report or the second CSI report. The apparatus further includes means for taking one or more actions based at least in part on the at least one occupation time.

One innovative aspect of the subject matter described in this disclosure can be implemented in an apparatus. The apparatus generally includes means for generating a channel state information (CSI) trigger state that triggers reporting at least one of a first CSI report associated with a first bandwidth part (BWP) that is active or a second CSI report associated with a second BWP that is non-active. The apparatus further includes means for determining, based on an active downlink (DL) BWP change, at least one occupation time of one or more CSI processing units (CPUs) associated with the first CSI report or the second CSI report. The apparatus also includes means for transmitting, to a user equipment (UE), control signaling indicating the CSI trigger state based on the determination.

One innovative aspect of the subject matter described in this disclosure can be implemented in a computer readable medium. The computer readable medium generally includes instructions stored thereon for receiving, from a base station via a first bandwidth part (BWP), control signaling that triggers reporting at least one of a first channel state information (CSI) report associated with the first BWP or a second CSI report associated with a second BWP that is non-active; determining, based on an indication of an active downlink (DL) BWP change, at least one occupation time of one or more CSI processing units (CPUs) associated with the first CSI report or the second CSI report; and taking one or more actions based at least in part on the at least one occupation time.

One innovative aspect of the subject matter described in this disclosure can be implemented in a computer readable medium. The computer readable medium generally includes instructions stored thereon for generating a channel state information (CSI) trigger state that triggers reporting at least one of a first CSI report associated with a first bandwidth part (BWP) that is active or a second CSI report associated with a second BWP that is non-active; determining, based on an active downlink (DL) BWP change, at least one occupation time of one or more CSI processing units (CPUs) associated with the first CSI report or the second CSI report; and transmitting, to a user equipment (UE), control signaling indicating the CSI trigger state based on the determination.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only some typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
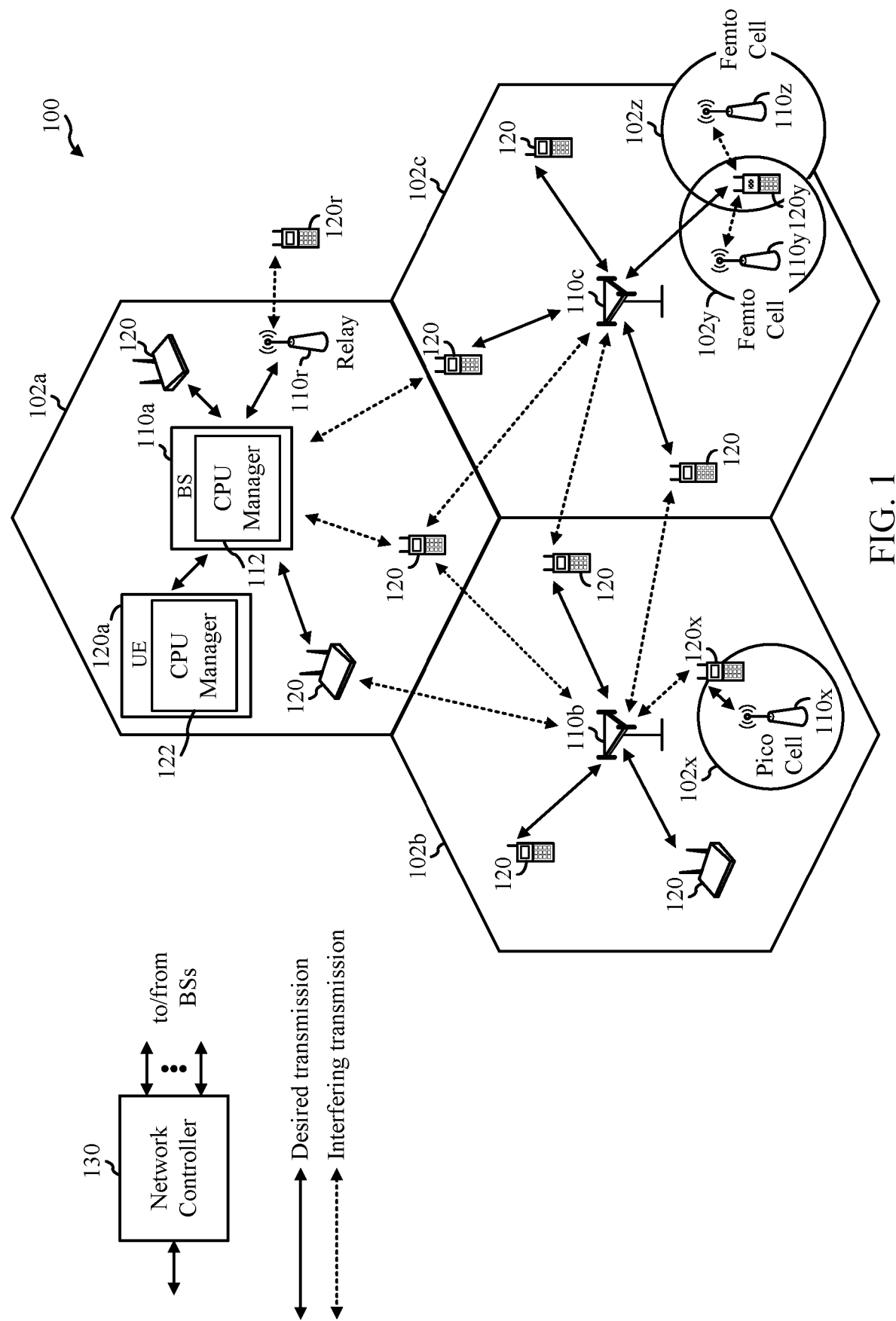
FIG. 1 is a block diagram conceptually illustrating an example wireless communication network, in accordance with some aspects of the present disclosure.

Aspects of the present disclosure provide apparatus, methods, processing systems, and computer readable mediums for channel state information (CSI) processing criteria.

As described above, under some CSI processing criteria, the UE may not take into account an indication of an active bandwidth part (BWP) change. In such cases, the CSI processing criteria may prevent the UE from performing some CSI calculations, even though the UE actually has processing resources available to perform those CSI calculations. For example, some criteria for determining which CSI reports may occupy CSI processing units (CPUs) may not consider the impact of active BWP changes occurring after control signaling indicating a CSI trigger state and before an uplink channel carrying the CSI report.

Various implementations relate generally to CSI processing criteria that take into account an indication of an active BWP change. In some aspects, a CPU occupancy may consider an active BWP change indication if a downlink channel carrying the BWP change indication and another downlink channel carrying the CSI trigger are sufficiently close, for example, when the BWP change indication is in the same control resource set (CORESET) as the control signaling that triggers CSI reports (such as, an aperiodic-CSI trigger state). In some aspects, the CPU occupancy may be triggered for CSI reports regardless of the BWP active state. In some cases, for CSI reports associated with non-active BWPs, the CPU occupancy may start from a BWP changing to an active state.

Particular implementations of the subject matter described in this disclosure can be implemented to realize one or more of the following potential advantages. In some implementations, the CSI processing criteria described herein can be used to provide efficient allocation of CPU occupancy, which may result in desirable channel estimations or less overhead (such as, downlink signaling) to schedule CSI reports. For example, the CSI processing criteria described herein may free up CPU occupancies when a BWP change indication is received, and the newly freed CPU occupancies may allow the UE to perform additional CSI calculations, which may positively affect channel estimations or the overhead used to schedule CSI reports.

The following description provides examples of CSI processing criteria in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 is a block diagram conceptually illustrating an example wireless communication network 100 in which aspects of the present disclosure may be performed. For example, the wireless communication network 100 may be an NR system (such as, a 5G NR network). According to some aspects, the BSs 110 and UEs 120 may be configured for CSI processing criteria. As shown in FIG. 1, the BS 110a includes a CPU manager 112 that determines, based on an active downlink (DL) bandwidth part (BWP) change, at least one occupation time of one or more CPUs associated with one or more CSI reports, in accordance with aspects of the present disclosure. The UE 120a includes a CPU manager 122 that determines, based on an indication of an active DL BWP change, at least one occupation time of one or more CPUs associated with one or more CSI reports, in accordance with aspects of the present disclosure.

NR access (such as, 5G NR) may support various wireless communication services, such as enhanced mobile broadband (eMBB) targeting wide bandwidth (such as, 80 MHz or beyond), millimeter wave (mmWave) targeting high carrier frequency (such as, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (such as, a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a-y* (each also individually referred to herein as UE 120 or collectively as UEs 120) in the wireless communication network 100. The UEs 120 (such as, 120*x*, 120*y*, etc.) may be dispersed throughout the wireless communication network 100, and each UE 120 may be stationary or mobile.

Wireless communication network 100 may also include relay stations (such as, relay station 110*r*), also referred to as relays or the like, that receive a transmission of data or other information from an upstream station (such as, a BS 110*a* or a UE 120*r*) and sends a transmission of the data or other information to a downstream station (such as, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (such as, directly or indirectly) via wireless or wireline backhaul.

Figure 2:
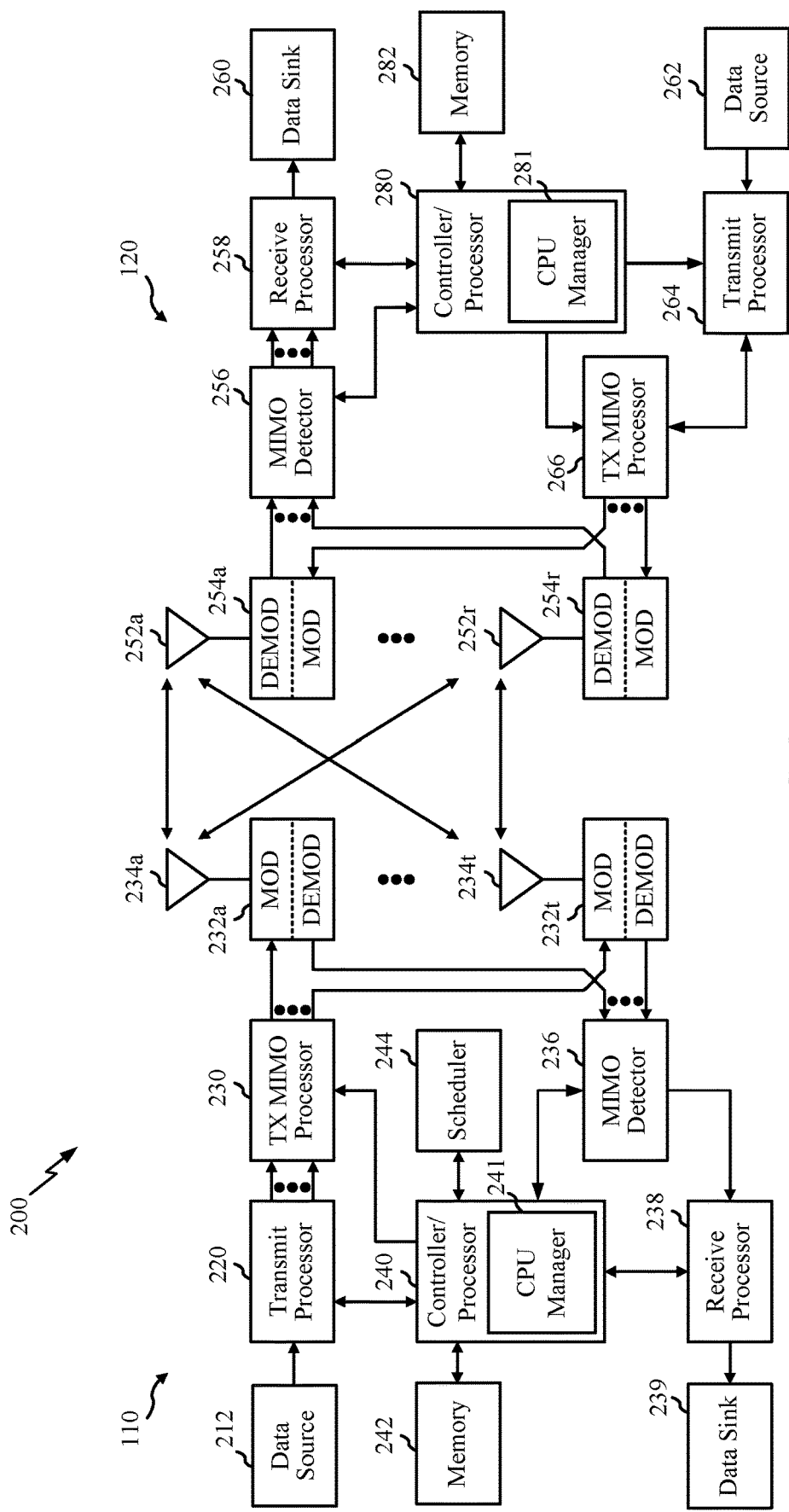
FIG. 2 is a block diagram conceptually illustrating a design of an example a base station (BS) and user equipment (UE), in accordance with some aspects of the present disclosure.

FIG. 2 is a block diagram conceptually illustrating a design of example BS 110*a* and UE 120*a* (such as, in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (such as, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (such as, precoding) on the data symbols, the control symbols, or the reference symbols, if applicable, and may provide output symbol streams to the modulators (MODs) 232*a*-232*t*. Each modulator 232 may process a respective output symbol stream (such as, for OFDM, etc.) to obtain an output sample stream. Each modulator may further process (such as, convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (such as, filter, amplify, downconvert, and digitize) a respective received signal to obtain input samples. Each demodulator may further process the input samples (such as, for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (such as, demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (such as, for the physical uplink shared channel (PUSCH)) from a data source 262 and control information (such as, for the physical uplink control channel (PUCCH) from the controller/processor 280. The transmit processor 264 may also generate reference symbols for a reference signal (such as, for the sounding reference signal (SRS)). The symbols from the transmit processor 264 may be precoded by a TX MIMO processor 266 if applicable, further processed by the demodulators in transceivers 254*a*-254*r* (such as, for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink or uplink.

The controller/processor 280 or other processors and modules at the UE 120*a* may perform or direct the execution of processes for the techniques described herein. For example, the controller/processor 240 of the BS 110*a* has a CPU manager 241 that determines, based on an active DL BWP change, at least one occupation time of one or more CPUs associated with one or more CSI reports, according to aspects described herein. The controller/processor 280 of the UE 120*a* has a CPU manager 241 that determines, based on an indication of an active DL BWP change, at least one occupation time of one or more CPUs associated with one or more CSI reports, according to aspects described herein. Although shown at the Controller/Processor, other components of the UE 120*a* and BS 110*a* may be used to perform the operations described herein.

Figure 3:
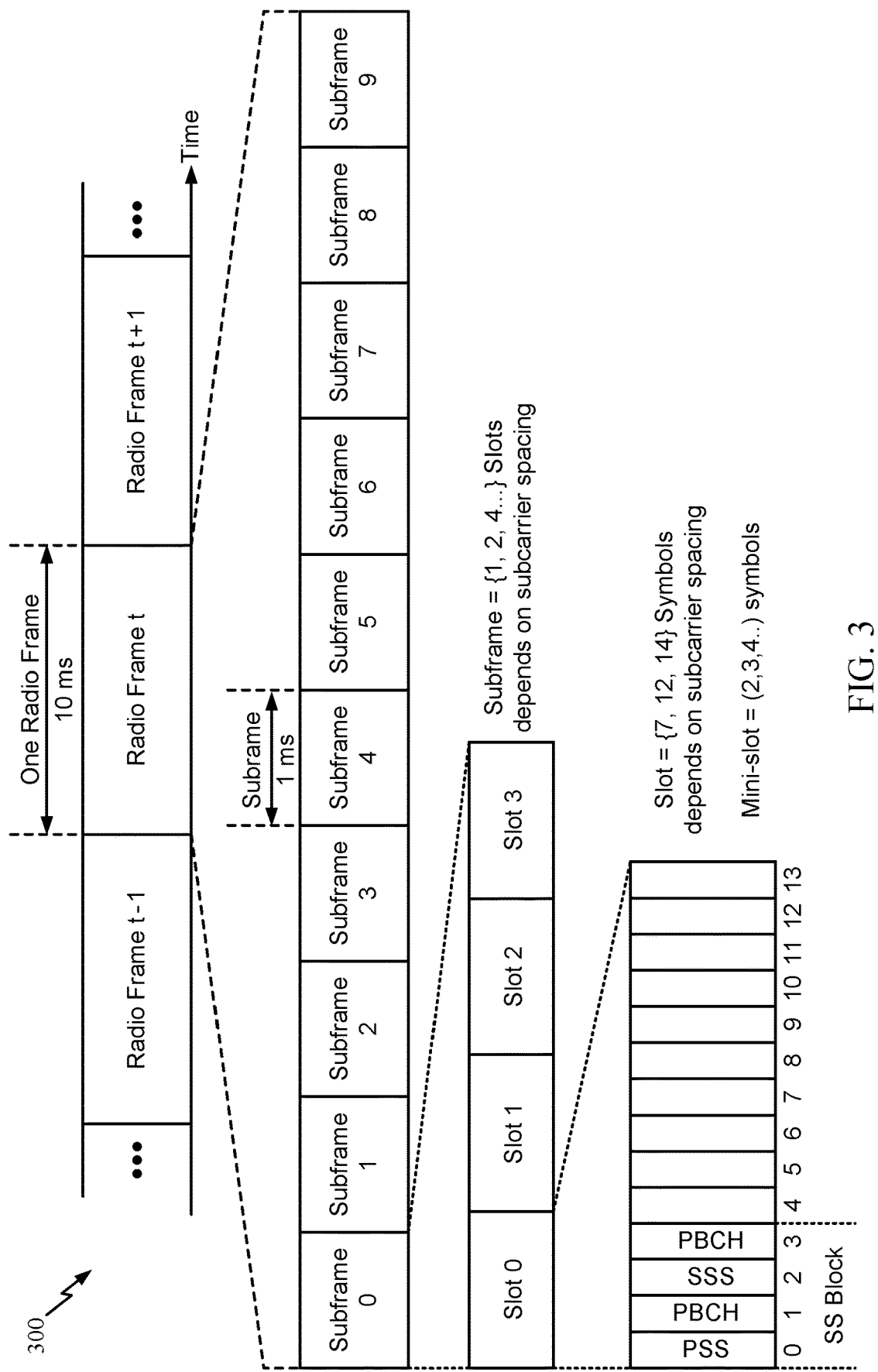
FIG. 3 illustrates an example of a frame format for a wireless communication system, in accordance with some aspects of the present disclosure.

FIG. 3 is a diagram showing an example of a frame format 300 for a wireless communication system (such as, NR). The transmission timeline for each of the downlink and uplink may be partitioned into units of radio frames. Each radio frame may have a predetermined duration (such as, 10 ms) and may be partitioned into 10 subframes, each of 1 ms, with indices of 0 through 9. Each subframe may include a variable number of slots depending on the subcarrier spacing. Each slot may include a variable number of symbol periods (such as, 7, 12, or 14 symbols) depending on the subcarrier spacing. The symbol periods in each slot may be assigned indices. A mini-slot, which may be referred to as a sub-slot structure, refers to a transmit time interval having a duration less than a slot (such as, 2, 3, or 4 symbols).

Each symbol in a slot may indicate a link direction (such as, DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in some subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Example CSI Processing Criteria

In some wireless communication networks (such as, 5G NR), bandwidth parts (BWPs) provide a flexible framework for dividing frequency-domain resources in a given carrier. With bandwidth parts, a carrier may be subdivided into different bandwidth segments referred to herein as BWPs. For instance, BWPs may overlap with each other or be non-contiguous (in other words, separated from each other, for example, by a guard band). The BWPs may be used for various purposes. For instance, during a period of low data activity (such as, low throughput demands), a UE may communicate with a narrower BWP, and during a period of high data activity (such as, high throughput demands), the UE may communicate with a wider BWP. In another case, the UE may be configured with a separate BWP to measure interference in a carrier. As another example, different BWPs may be used for different services, such as eMBB services (such as, conversational voice or video services) or URLLC services (such as, augmented reality services). In some cases, different BWPs may enable coexistence of different cells, wireless systems, or networks.

A UE may be configured with multiple BWPs where only one of the BWPs is active. That is, the UE may only communicate via one of the BWPs when that BWP is active. The UE may be switched from one BWP to another BWP dynamically (such as, triggered by downlink control information (DCI)). For example, the UE may receive, from a BS, downlink control signaling (such as, DCI) that indicates changing to a different BWP.

In wireless communications, CSI may refer to known channel properties of a communication link. The CSI may represent the combined effects of, for example, scattering, fading, and power decay with distance between a transmitter and receiver. Channel estimation may be performed to determine these effects on the channel. CSI may be used to adapt transmissions based on the current channel conditions, which is useful for achieving reliable communication, in particular, with high data rates in multi-antenna systems. CSI is typically estimated at the receiver (such as, UE 120), quantized, and reported to the transmitter (such as, BS 110). As an example, CSI may include various parameters such as a Channel Quality Indicator (CQI), a precoding matrix indicator (PMI), a CSI-RS resource indicator (CRI), a SS/PBCH Block Resource indicator (SSBRI), a layer indicator (LI), a rank indicator (RI) or L1 reference signal received power (L1-RSRP).

Figure 4:
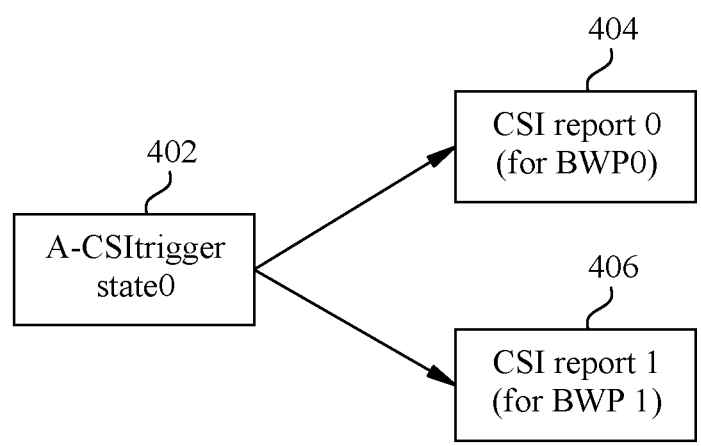
FIG. 4 illustrates an example aperiodic-channel state information (CSI) trigger state.

A UE may be configured to report CSI on a periodic, semi-persistent, or periodic basis. In some cases, the UE may be configured with multiple aperiodic-CSI (A-CSI) trigger states associated with various CSI parameters and CSI measurement resources (such as, one or more non-zero power CSI reference signals (NZP-CSI-RS) resources, or one or more CSI interference measurement (CSI-IM) resources, etc.). As used herein, the CSI measurement resources (or CSI resources) may refer to the wireless communication resources that a UE uses to monitor and measure channel properties of reference signals or interference. An A-CSI trigger state may be associated with multiple CSI report configurations, and each of the CSI report configurations may indicate the measurement resources to monitor on a given BWP, the CSI parameters to measure (such as, CQI, PMI, etc.), and the uplink resource to use in reporting the CSI reports. For example, FIG. 4 illustrates an example A-CSI trigger state 402 that is associated with a first CSI report 404 having measurement resources on a first BWP (BWP0) and second CSI report 406 having measurement resources on a second BWP (BWP1). The CSI report configurations in the same A-CSI trigger state may be associated with NZP-CSI-RS or CSI-IM resources in the same BWP or different BWP.

As a UE has limited processing resources, a UE may support a limited number of simultaneous (such as, parallel or concurrent) CSI calculations given by $N_{CPU}$. If a UE supports $N_{CPU}$ simultaneous CSI calculations, the UE may have $N_{CPU}$ CSI processing units (CPU) for processing CSI reports across all configured cells. If L CPUs are occupied for calculation of CSI reports in a given OFDM symbol, the UE has $N_{CPU}-L$ unoccupied CPUs. The UE may not be allowed to exceed the maximum number of simultaneous CSI calculations at a given time. That is, if there are no unoccupied CPUs at a given time, the UE may not perform any further CSI calculations until a CPU becomes unoccupied.

When an A-CSI trigger state is triggered, the UE may determine which CSI reports in the trigger state will occupy a CPU and the occupation time of the CPUs associated with such CSI reports. As used herein, the occupation time of a CPU may refer to a time period when a CPU is occupied. Whether a CSI report occupies a CPU may depend on the CSI reporting time line, available CPUs, etc. In general, an aperiodic CSI report may occupy one or more CPU(s) from the first symbol after the PDCCH triggering the CSI report until the last symbol of the PUSCH carrying the report.

Some criteria for determining which CSI reports may occupy CPU(s) may not consider the impact of active BWP changes happening later than the PDCCH carrying the CSI trigger state and earlier than the PUSCH carrying the CSI report. A CSI report associated with a non-active BWP when the PDCCH is transmitted may be dropped, for example, regardless of the availability of the measurement resource due to an active BWP change. In such a case, the CPU occupancy may be too aggressive, such that some CPUs are booked for a CSI report that is not updated eventually due to the BWP change.

Figure 5:
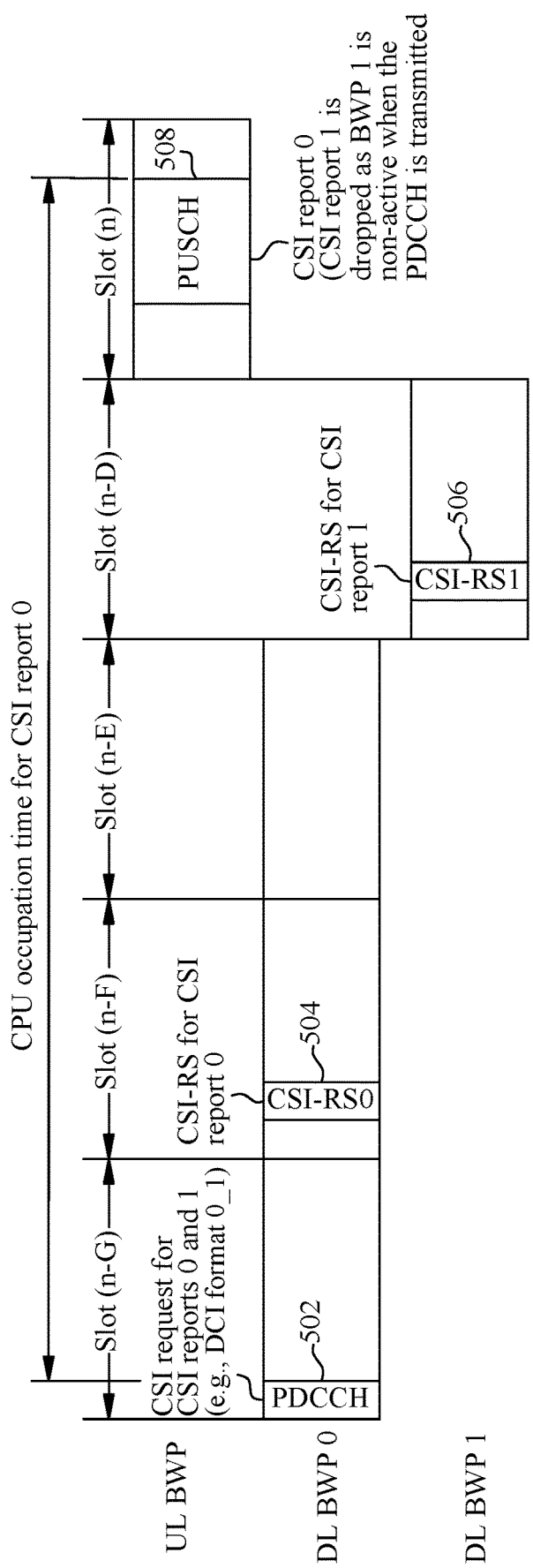
FIG. 5 illustrates an example CSI reporting timeline where a UE ignores a CSI report configuration associated with the non-active BWP is ignored.

In some cases, the UE may drop a CSI report if the CSI report is associated with a non-active BWP. Expressed another way, the UE may drop the CSI report from occupying a CPU if the CSI report is associated with a different BWP from the BWP on which the UE received the PDCCH carrying the CSI trigger state. For example, FIG. 5 illustrates an example CSI reporting timeline where the UE ignores the CSI report configuration associated with the non-active BWP. As shown, a UE may receive a PDCCH carrying an A-CSI trigger state 502 associated with a first CSI report 504 on BWP0 and a second CSI report 506 on BWP1. The A-CSI trigger state 502 may also indicate to send the CSI report 504, 506 on a PUSCH 508. As the BWP1 is non-active, the UE drops the second CSI report 506 from occupying a CPU, but because the BWP0 is active, the UE determines that the first CSI report 504 occupies a CPU from the first symbol after the PDCCH (A-CSI trigger state 502) triggering the CSI report until the last symbol of the PUSCH 508. Such a CSI processing framework may prevent the UE from performing a CSI calculation for the second CSI report 506, if the UE receives a BWP change indication to activate the BWP1 later than the PDCCH carrying the A-CSI trigger state 502 and earlier than the PUSCH 508.

Figure 6:
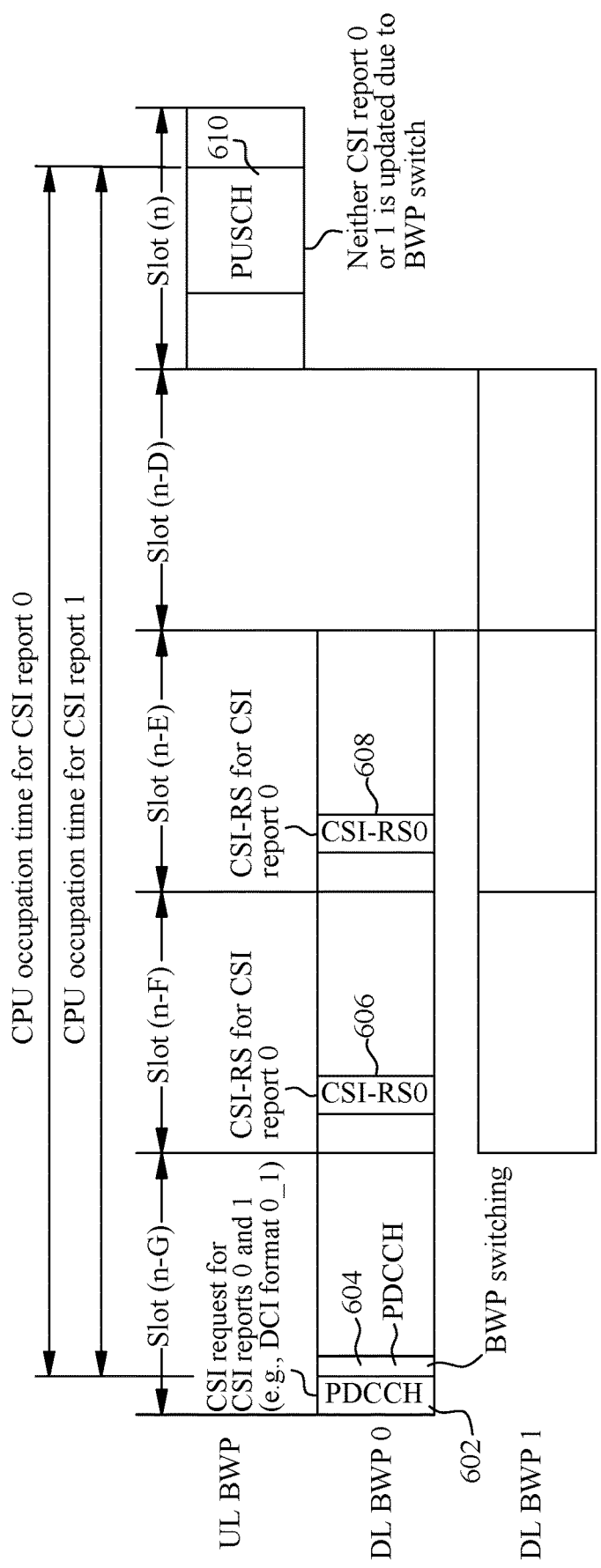
FIG. 6 illustrates an example CSI reporting timeline where CSI reports may be scheduled on a non-active BWP due to an active BWP change.

In other cases, the UE may reserve CPUs for CSI reports associated with a BWP that becomes non-active due to an active BWP change. In other words, the CPUs may be occupied for CSI calculations that the UE will not perform, resulting in wasted processing resources for other CSI calculations. For example, FIG. 6 illustrates an example CSI reporting timeline where the CSI reports may be scheduled on a non-active BWP due to an indication of a DL BWP change. As shown, a UE may receive an A-CSI trigger state 602 associated with a first CSI report 606 and a second CSI report 608, each of which having measurement resources on BWP0. The A-CSI trigger state 602 may indicate to send the CSI feedback via the PUSCH 610. Within the same control resource set (CORESET), the UE may also receive an indication of a DL BWP change 604 indicating that BWP1 is active at the next slot and also making BWP0 non-active during the scheduled measurement resources for the CSI reports 606, 608. As BWP0 is non-active during the scheduling measurement resources, the UE is not able to take measurements for the CSI reports 606, 608. In other words, the UE does not provide any feedback or any updated feedback to the base station related to the CSI reports 606, 608. Because the CSI reports 606, 608 were associated with an active BWP at the time of triggering, the UE determines that the CSI reports 606, 608 occupy two CPUs from the first symbol after the PDCCH (A-CSI trigger state 602) triggering the CSI reports until the last symbol of the PUSCH 610. Such a CSI processing framework may prevent the UE from performing other CSI calculations, even though the UE actually has processing resources available to perform those CSI calculations.

Aspects of the present disclosure provides CSI processing criteria that takes into account an indication of an active BWP change. In some aspects, the CPU occupancy may consider an active BWP change indication if the active BWP change indication is signaled sufficiently close (such as, based on a given number of symbols) to the CSI trigger state in the same CORESET as the control signaling that triggers CSI reports (such as, A-CSI trigger state). For instance, if the CSI trigger state and the active BWP change indication are close enough, the UE may determine whether the measurement resources are on an active BWP based on the BWP change indication and set the occupancy of the CPUs according to the active state of the BWPs. In other aspects, the CPU occupancy may be triggered for CSI reports regardless of the BWP active state. For instance, the UE may set the occupancy of the CPUs for each of the CSI reports in a trigger state. In other cases, for CSI reports associated with non-active BWPs, the CPU occupancy may start from the BWP switching. For example, the UE may wait to set the CPU occupancy for a CSI report associated with a non-active BWP until the UE receives an indication of an active BWP change. The CSI processing criteria described herein may provide efficient allocation of CPU occupancy such as the CPU occupancy of CSI measurements scheduled on non-active BWPs. In aspects, the CSI processing criteria described herein may provide allocation of CPU occupancies, which may result in desirable channel estimations or less overhead (such as, downlink signaling) to schedule CSI reports.

In some aspects, the CPU occupancy may consider the active or non-active state of BWPs if an active BWP change indication is signaled close enough to a CSI trigger state, for example, when the active BWP change indication is in the same CORESET as the control signaling that triggers CSI reports (such as, A-CSI trigger state). Expressed another way, a BWP change may be considered in determining CPU occupancy if the PDCCH carrying the BWP change indication and the PDCCH carrying the CSI trigger are sufficiently close. The closeness between the BWP change indication and the CSI trigger may be defined by a gap between the last symbol of the PDCCH carrying the CSI trigger and the last symbol of the PDCCH carrying the BWP change indication. In aspects, the UE may determine whether a gap between the downlink channel (such as, a PDCCH) carrying the active BWP change indication and the other downlink channel carrying the CSI trigger state is within a threshold, and if the gap is within (equal to or less than) the threshold, the UE may consider the active/non-active state of the BWPs according to the resource grants in the BWP change indication. Assuming, for example, the threshold is 1 symbol, if the last symbol of the PDCCH carrying the CSI trigger is symbol 0 in a slot, then the last symbol of the PDCCH carrying the indication of BWP change either be symbol 0 or 1 in the slot, but cannot be symbol 2 to invoke considering the BWP change. Such a threshold may enable the UE to consider the BWP change via cross-carrier signaling, for example, if the CSI trigger is signaled on a first component carrier (CC0), while the BWP change indication is signaled on a second component carrier (CC1).

In some aspects, the timing relationship among the PDCCH carrying the A-CSI trigger, the PDCCH carrying the indication of BWP change, and the measurement resources associated with the triggered CSI reports may fulfill various factors. In some aspects, the last symbol of the PDCCH span of the DCI carrying the indication of BWP change may not be later than the last symbol of the PDCCH span of the DCI carrying the CSI trigger, irrespective of which CC carries the control signaling or the subcarrier spacing (SCS) of the BWP. In aspects, the gap from the end of the last symbol of the PDCCH span of the DCI carrying the indication of BWP change to the end of the last symbol of the PDCCH span of the DCI carrying the CSI trigger may be less than or equal to a threshold (such as, zero symbols), which may be either predefined or signaled by the BS. For example, if the last symbol of the PDCCH span of the DCI carrying the BWP change is no later than the last symbol of the PDCCH span of the CSI trigger DCI (in other words, the gap is less than or equal to zero symbols), the UE may determine the first occupation time or second occupation time according to the indication of the active DL BWP change as further described herein. Otherwise, the UE may not consider the active BWP change. That is, if the last symbol of the PDCCH span of the DCI carrying the BWP change is later than the last symbol of the PDCCH span of the CSI trigger DCI (in other words, the gap is greater than zero symbols), the UE may not consider the active BWP change. In some aspects, the UE may not be expected to receive any other BWP change in the time duration from the end of the last symbol of the PDCCH span covering CSI trigger DCI to the start of the first symbol of the measurement resources associated with the triggered CSI report.

Figure 7:
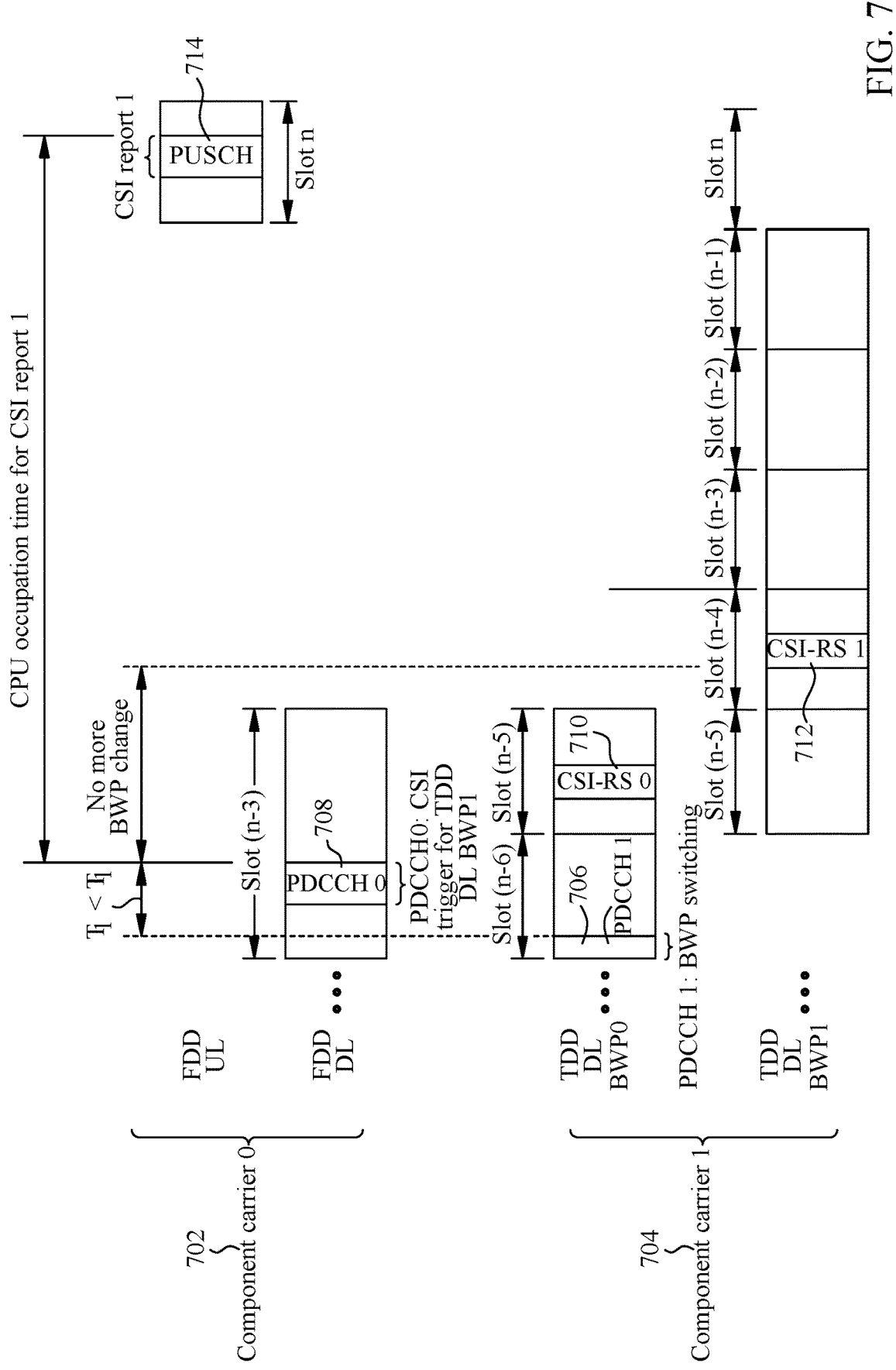
FIG. 7 illustrates an example CSI reporting timeline where the CSI processing unit (CPU) occupancy may consider cross-carrier scheduling, in accordance with some aspects of the present disclosure.

FIG. 7 illustrates an example CSI reporting timeline where the CPU occupancy may consider cross-carrier scheduling, in accordance with some aspects of the present disclosure. As shown, a UE may be configured with an FDD component carrier (CC) 702 and a TDD CC 704, where the SCS of the UL of the FDD CC, the SCS of the DL of FDD CC, and the SCS of the TDD CC may be different. The UE may receive on a DL BWP0 of the TDD CC 704, a PDCCH 706 carrying an indication of a BWP change that, since slot (n−5), the DL BWP0 of the TDD CC 704 is inactive and DL BWP1 of the TDD CC 704 is active. The UE may receive, on the FDD component carrier, an A-CSI trigger state 708 associated with a first CSI report having a measurement resource 710 in the DL BWP 0 of the TDD CC 704 and a second CSI report having a measurement resource 712 in the DL BWP 1 of the TDD CC 704. In this example, $t_1$, the time duration from the end of the last symbol of the PDCCH 706 to the end of the last symbol of the PDCCH 702, is less than $T_1$, where $T_1$ is a threshold that may be predefined or BS signaled. The UE may report the triggered CSI reports in a PUSCH 714 on the UL of the FDD CC 702. In the PUSCH 714, the first CSI report is either dropped or not updated, as the corresponding measurement resource 710 is not available due to the BWP change. In aspects, if $t_1 \leq T_1$ or $t_1 < T_1$, the UE may take into account the BWP change indication when determining the CPU occupancy of the second CSI report. In some aspects, the UE may ignore the request in PDCCH 704, if $t_1 \leq T_1$. That is, if $t_1 > T_1$ or $t_1 > T_1$, the UE may not take into account the BWP change indication when determining the CPU occupancy of the second CSI report. If no CPUs are allocated, the UE may not update at least some of the CSI reports (such as, the first CSI report and the second CSI report) requested in PDCCH 708. In the time duration from the end of the last symbol of the PDCCH 708 to the start of the first symbol of the measurement resource 712 on the active BWP after BWP change, the UE may not expect the BS to send any additional indication of BWP change.

If a PDCCH carrying an A-CSI trigger state and another PDCCH carrying an active BWP change indication are received in the same CORESET, the UE may determine the availability of the associated measurement resources for each CSI report in the trigger assuming the BWP is switched according to the active BWP change indication. The UE may set the occupancy of CPU(s) for the CSI reports in accordance with the availability of the measurement resources as provided in the BWP change indication.

Figure 8:
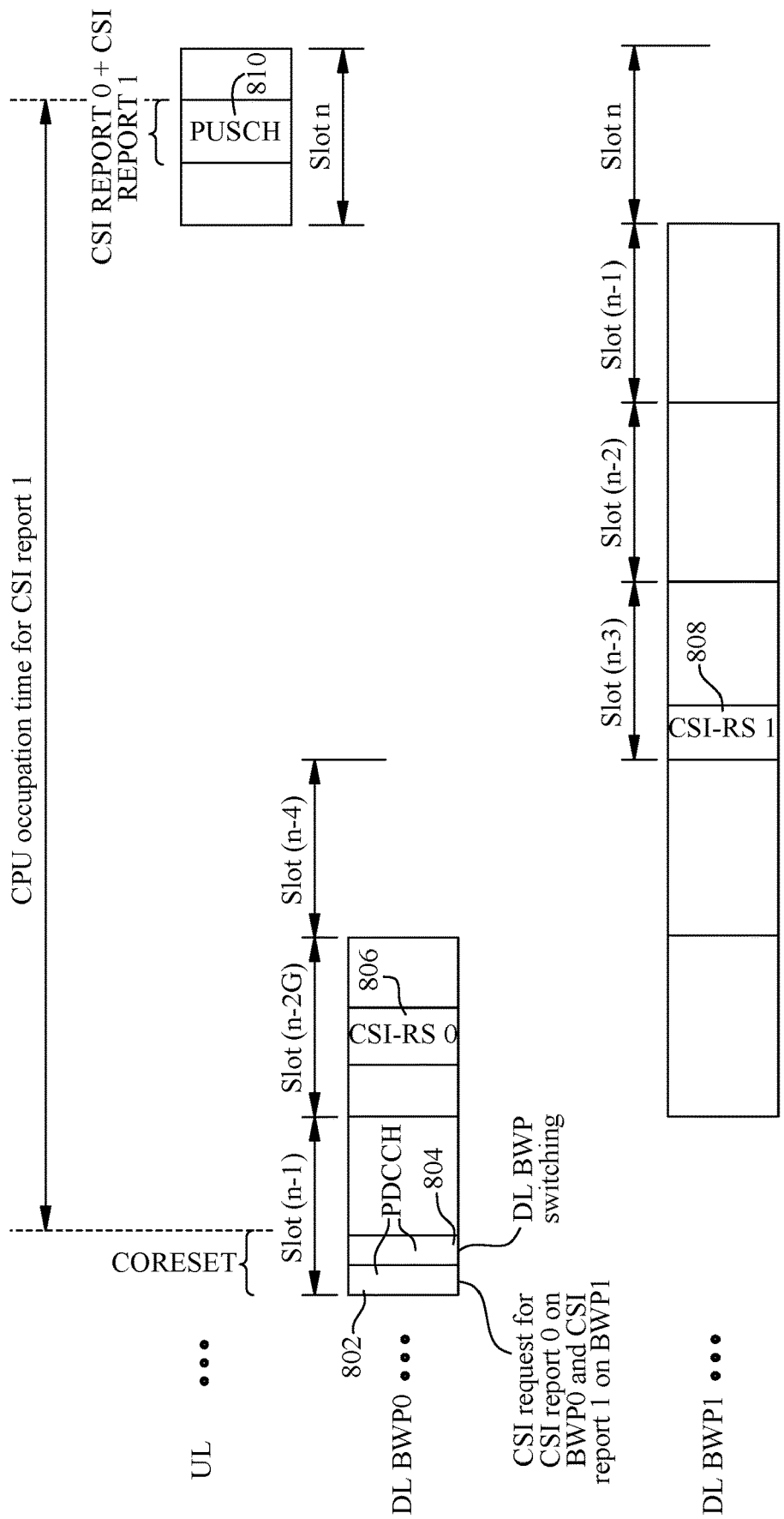
FIG. 8 illustrates an example CSI reporting timeline where a UE takes into account an active BWP change indication, in accordance with some aspects of the present disclosure.

FIG. 8 illustrates an example CSI reporting timeline where the UE takes into account the active BWP change indication, in accordance with some aspects of the present disclosure. As shown, a UE may receive an A-CSI trigger state 802 associated with a first CSI report 806 having a measurement resource on BWP0 and a second CSI report 808 having a measurement resource on BWP1. The A-CSI trigger state 802 may indicate to send the CSI feedback via the PUSCH 810. Within the same CORESET, the UE may also receive an indication of a DL BWP change 804 indicating that BWP1 is active at the next slot, resulting in BWP0 being non-active during the scheduled measurement resources for the CSI report 806 and BWP1 being active during the scheduled measurement resources for the CSI report 808. If the gap between the A-CSI trigger state 802 and the DL BWP change 804 satisfies a threshold, the UE may take into account whether the corresponding BWPs are active during the scheduled measurement resources according to the active BWP change indication. In this example, the UE determines that the CPU(s) for the CSI report 808 are occupied and that the CSI report 806 will not occupy any CPU(s) due to BWP0 being non-active. The occupation time of the CPU(s) for CSI report 808 may run from the first symbol later than the CORESET until the last symbol of the PUSCH 810 carrying the CSI report 808.

In other aspects, the CPU occupancy may be set for CSI reports regardless of the BWP active state. That is, the UE may determine the CPU occupancy associated with CSI reports without taking into account whether the measurement resources are scheduled on active or non-active BWPs.

Figure 9:
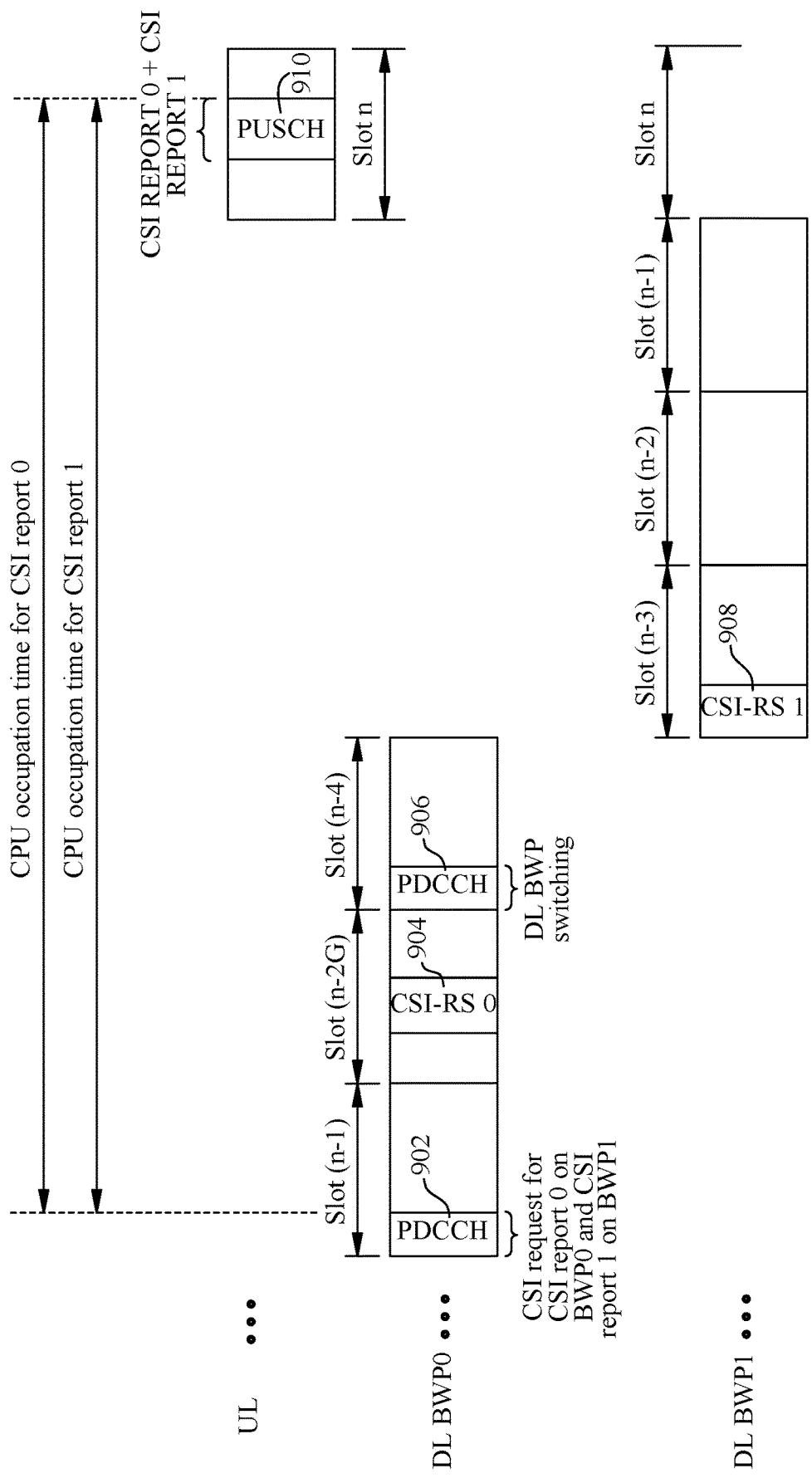
FIG. 9 illustrates an example CSI reporting timeline where a UE sets the CPU occupancy without taking into account the BWP active state, in accordance with some aspects of the present disclosure.

FIG. 9 illustrates an example CSI reporting timeline where the UE sets the CPU occupancy without taking into account the BWP active state, in accordance with some aspects of the present disclosure. As shown, a UE may receive an A-C SI trigger state 902 associated with a first CSI report 904 having a measurement resource on BWP0 and a second CSI report 908 having a measurement resource on BWP1. The A-CSI trigger state 902 may indicate to send the CSI feedback via the PUSCH 910. In a later slot, the UE may receive an indication of a DL BWP change 906 indicating that BWP1 is active at a later slot during the measurement resources associated with the CSI report 908. Regardless of the active state of the BWPs, the UE may set the occupancy of the CSI reports 904, 908. In some aspects, the occupation time of the CPU(s) for the CSI reports 904, 908 may run from the first symbol later than the PDCCH carrying the A-CSI trigger state 902 until the last symbol of the PUSCH 910 carrying the CSI reports 904, 908.

Figure 10:
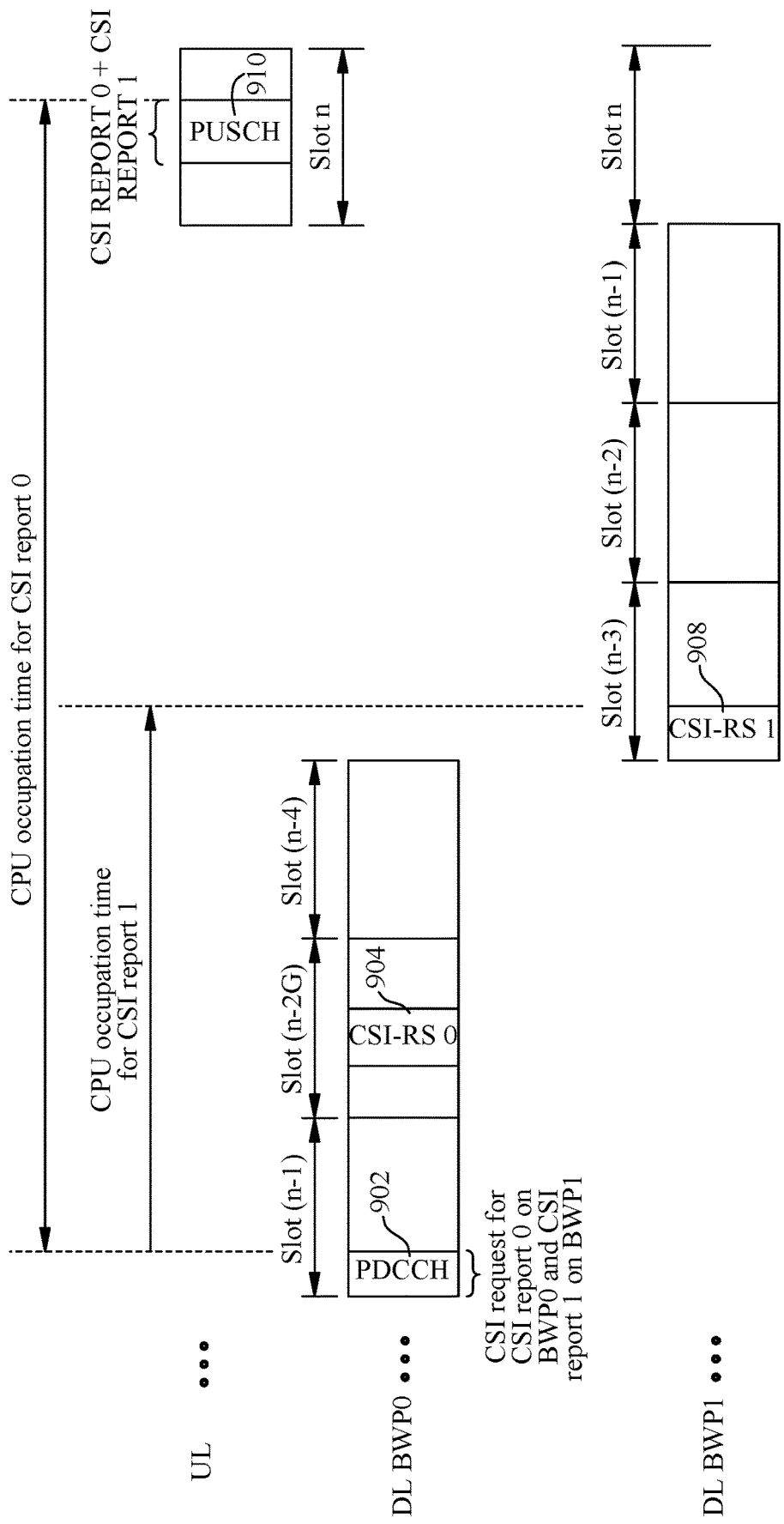
FIG. 10 illustrates an example CSI reporting timeline where the UE releases the CPU occupancy for a CSI report if there is no active BWP change before the CSI resources, in accordance with some aspects of the present disclosure.

In some cases, the UE may initiate the CPU occupancy without taking into account the active state of the BWPs, but retire the CPU occupancy of a CSI report on a non-active BWP if the UE fails to receive an indication of an active BWP change before the measurement resources for such a CSI report on the non-active BWP. In other words, the CPU occupancy FIG. 10 illustrates an example CSI reporting timeline where the UE retires the CPU occupancy for a CSI report if there is no active BWP change before the measurement resources, in accordance with some aspects of the present disclosure. As shown, the UE may receive the same A-CSI trigger state 902 as described herein with respect to FIG. 9. In this example, the UE initiates the CPU occupancy for the CSI reports 904, 908, regardless of the active state of the BWPs. As the UE does not receive an active BWP change indication, the UE may terminate the CPU occupancy associated with the second CSI report 908. In some aspects, the occupation time of the CPU(s) for the second CSI report 908 may run from the first symbol later than the PDCCH carrying the A-CSI trigger state 902 until the last symbol of the measurement resources associated with the CSI report 908. The occupation time of the CPU(s) for the first CSI report 904 may run from the first symbol later than the PDCCH carrying the A-CSI trigger state 902 until the last symbol of the PUSCH 910 carrying the CSI reports 904.

In aspects, for CSI reports associated with measurement resources on non-active BWPs, the CPU occupancy may start from when the non-active BWP is changed to an active BWP. That is, the UE may delay the occupancy of CPUs for a CSI report associated with measurement resources on a non-active BWP until the UE receives an indication of an active BWP change for the measurement resources. In some aspects, the occupation time of the CPU(s) for a CSI report associated with measurement resources on a non-active BWP may start from the reception of the active BWP change indication. In other aspects, the occupation time may start from when the non-active BWP becomes active.

Figure 11:
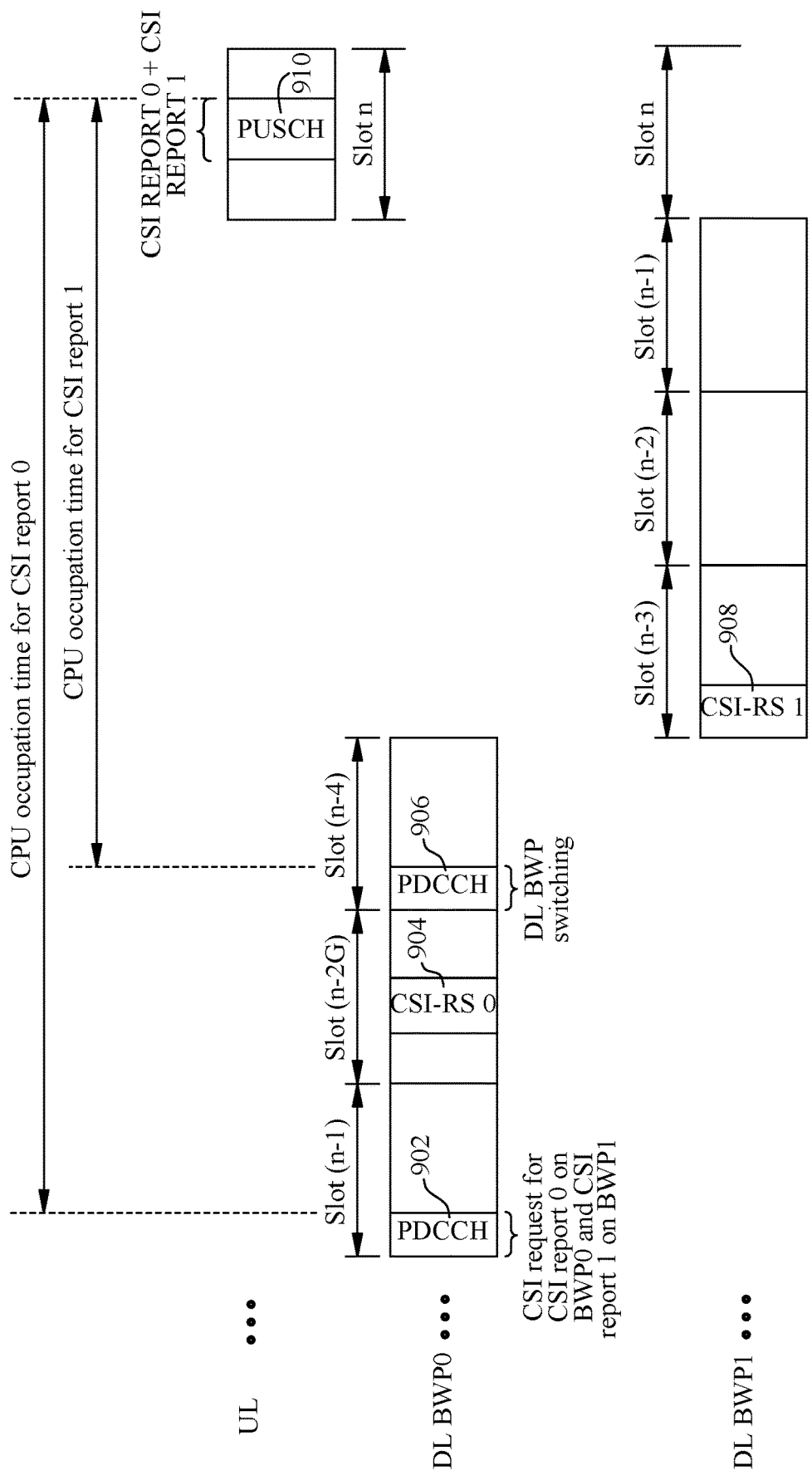
FIG. 11 illustrates an example CSI reporting timeline where the UE delays when the CPU occupancy for a CSI report begins until an active BWP change is received, in accordance with some aspects of the present disclosure.

FIG. 11 illustrates an example CSI reporting timeline where the UE delays when the CPU occupancy for a CSI report begins until an active BWP change is received, in accordance with some aspects of the present disclosure. As shown, the UE may receive the same A-CSI trigger state 902 and DL BWP change indication 906 as described herein with respect to FIG. 9. In this example, the occupation time of the CPU(s) for the second CSI report 908 may run from the first symbol later than the PDCCH carrying the DL BWP change indication 906 until the last symbol of the measurement resources associated with the CSI report 908. In other cases, where the UE receives the A-CSI trigger state and DL BWP change indication in the same CORESET, such as depicted in FIGS. 6 and 9, the occupation time for the CSI report associated with a non-active BWP may start from the first symbol later than the CORESET carrying the A-CSI trigger state and DL BWP change indication.

Figure 12:
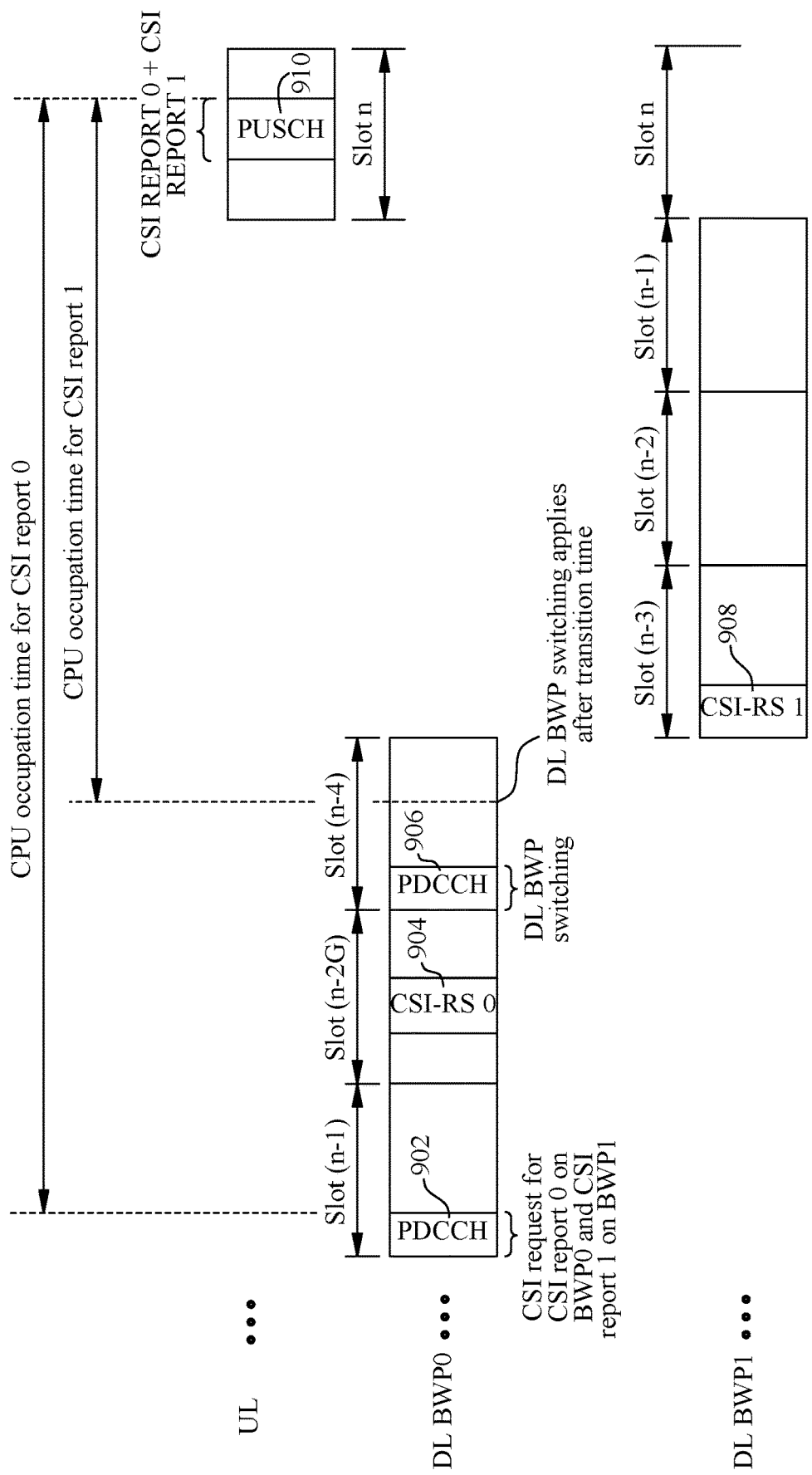
FIG. 12 illustrates an example CSI reporting timeline where the UE delays when the CPU occupancy for a CSI report begins until a non-active BWP changes to an active BWP, in accordance with some aspects of the present disclosure.

FIG. 12 illustrates an example CSI reporting timeline where the UE delays when the CPU occupancy for a CSI report begins until a non-active BWP changes to an active BWP, in accordance with some aspects of the present disclosure. As shown, the UE may receive the same A-C SI trigger state 902 and DL BWP change indication 906 as described herein with respect to FIG. 9. In this example, the occupation time of the CPU(s) for the second CSI report 908 may run from the first symbol later than when BWP1 change to an active BWP until the last symbol of the measurement resources associated with the CSI report 908.

As the BWP change indication may act like a second trigger for a CSI report, the UE may determine whether there is sufficient CSI computation time for CSI reports on a non-active BWP according to various UE CSI computation time criteria. As an example, the CSI processing between the BWP change indication and the PUSCH may follow various UE CSI computation time criteria including Z or Z', for example, as defined in 3GPP Technical Specification 38.214, *Physical layer procedures for data*. For instance, the UE may refrain from providing a CSI report if the occupation time fails to provide enough CSI computation time according to the thresholds Z or Z'. In some aspects, if the gap from the end of the last symbol of the PDCCH carrying the active BWP change indication and the start of the PUSCH carrying the CSI report is at least Z symbols, the UE may proceed with the CSI computation; otherwise, the UE may refrain from processing the CSI report. In other aspects, if the gap from the end of the last symbol of the CORESET including the PDCCH carrying the active BWP change indication and the start of the PUSCH carrying the CSI report is at least Z symbols, the UE may proceed with the CSI computation; otherwise, the UE may refrain from processing the CSI report.

While the examples provided herein are described with respect to the UE managing the CPU occupancy to facilitate understanding, aspects of the present disclosure may also be applied to a base station managing the CPU occupancy of a UE according to the CSI processing criteria described herein to determine whether the UE has enough processing resources (such as, CPUs) to provide updated feedback on the CSI reports.

Figure 13:
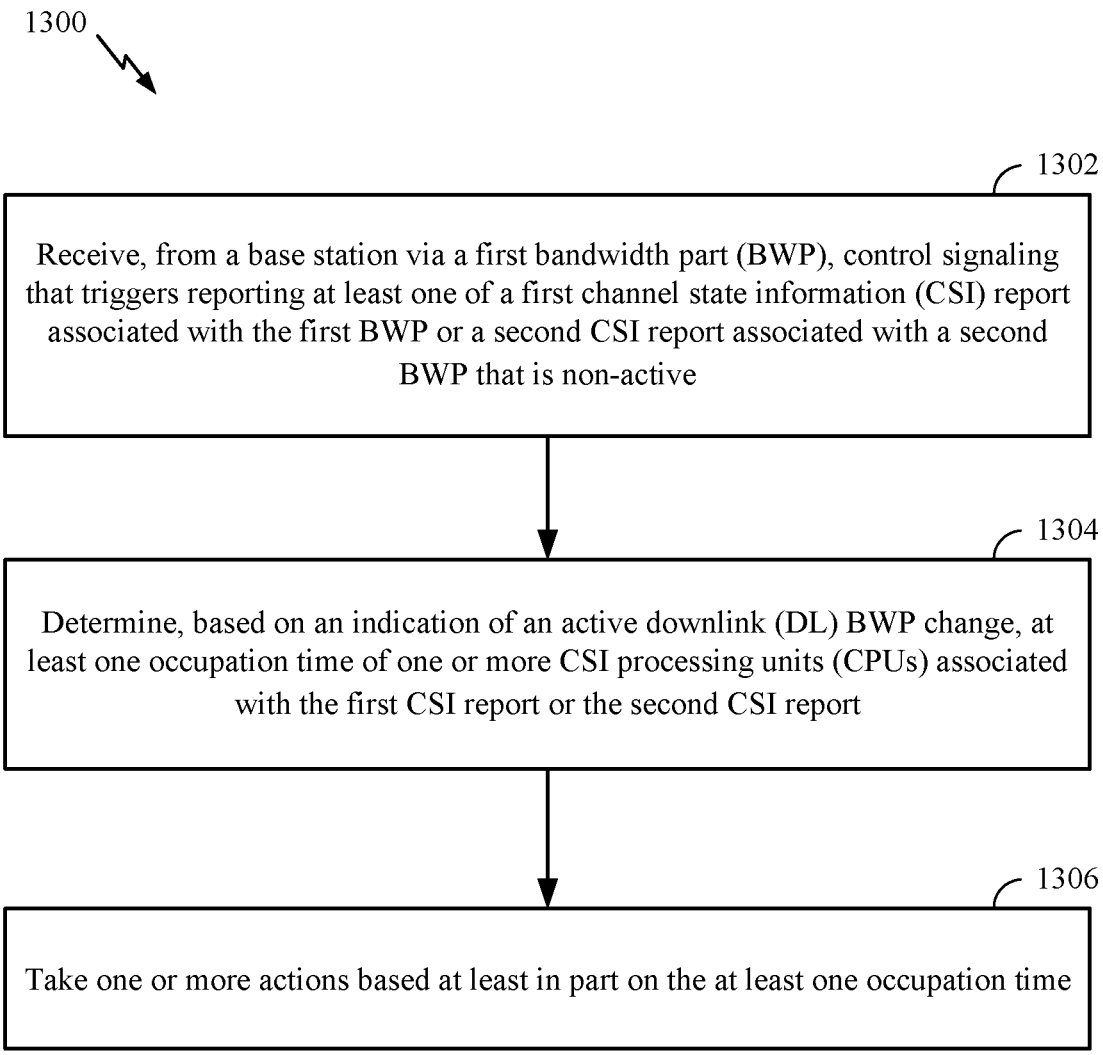
FIG. 13 shows a flowchart illustrating an example process for wireless communication (for example, by a UE), in accordance with some aspects of the present disclosure.

FIG. 13 shows a flowchart illustrating an example process 1300 for wireless communication, in accordance with some aspects of the present disclosure. The operations 1300 may be performed, for example, by a UE (such as, the UE 120a in the wireless communication network 100). Operations 1300 may be implemented as software components that are executed and run on one or more processors (such as, controller/processor 280 of FIG. 2). Further, the transmission and reception of signals by the UE in operations 1300 may be enabled, for example, by one or more antennas (such as, antennas 252 of FIG. 2). In some aspects, the transmission or reception of signals by the UE may be implemented via a bus interface of one or more processors (such as, controller/processor 280) obtaining or outputting signals.

The operations 1300 may begin, in block 1302, where the UE may receive, from a base station (such as, BS 110a) via a first BWP (such as, BWP0 of FIGS. 8-12), control signaling that triggers reporting at least one of a first CSI report associated with the first BWP or a second CSI report associated with a second BWP that is non-active (such as, BWP1 of FIGS. 8-12). In block 1304, the UE may determine, based on an indication of an active DL BWP change, at least one occupation time of one or more CPUs associated with the first CSI report or the second CSI report. In block 1306, the UE may take one or more actions based at least in part on the at least one occupation time.

The control signaling may include triggers for various CSI reports. For instance, the control signaling may trigger CSI reports that are only associated with active BWP(s), such as the first BWP. The control signaling may trigger CSI reports that are only associated with non-active BWP(s), such as the second BWP. In other cases, the control signaling may trigger CSI reports associated with a mix of active BWPs and non-active BWPs (such as, the first BWP and second BWP). The control signaling may include a DCI message having an A-CSI trigger state associated with one or more CSI reports (such as, the first CSI report or second CSI report) as described herein. In aspects, the control signaling may be a DCI message (such as, an UL-grant having DCI format 0_1) that includes the indication of the active DL BWP change indicating when the second BWP is active.

In aspects, a CSI report may occupy one or more CPUs depending on various factors, including the number of CSI-RS resources in a CSI resource set associated with the CSI report, the type of CSI report, and the CSI processing timing requirement, etc.

Determining at least one occupation time in block 1304 may include the UE determining, based on the indication of the active DL BWP change, at least one of a first occupation time of a first number of CPUs associated with the first CSI report or a second occupation time of a second number of CPUs associated with the second CSI report.

The operations 1300 may further include the UE receiving, from the base station, DCI that includes the indication of the active DL BWP change indicating when the second BWP is active. For example, DCI format 1_1 (a DL resource grant) may include a BWP indicator field, and the UE may compare the indicated BWP identifier (Id) in the DL resource grant with the active DL BWP identifier to determine if the DCI indicates an active DL BWP change. For a TDD system, because DL and UL BWP are implicitly linked by the same BWP identifier, if a UE receives a DCI format 0_1 (UL-grant) where the BWP indicator field indicates an active UL BWP change, the DCI may also implicitly indicate an active DL BWP change.

In some aspects, the CPU occupancy may take into account the BWP change indication if the PDCCH carrying the BWP change indication and the PDCCH carrying the CSI trigger are sufficiently close, for example, if the active BWP change indication is in the same CORESET as the control signaling that triggers CSI reports (such as, A-CSI trigger state). The UE may receive the indication of the active DL BWP change in the same CORESET as the control signaling. For example, the operations 1300 may include the UE receiving, from the base station, on a CORESET including the control signaling and additional control signaling that includes the indication of the active DL BWP change indicating when the second BWP is active. The additional control signaling may include a DCI message indicating a resource grant (such as, a DL or UL resource grant) on the second BWP (such as, a BWP identifier). In other cases, the UE may receive the additional control signaling outside of the CORESET carrying the control signaling.

The UE may determine if a gap from a last time-domain resource (such as, a symbol) of a first downlink channel (such as, PDCCH) carrying the control signaling to a last time-domain resource (such as, a symbol) of a second downlink channel (such as, PDCCH) carrying the additional control signaling is less than or equal to a threshold (such as, 3 symbols or 0 symbols). If the gap is less than or equal to the threshold, the UE may determine the first occupation time or second occupation time according to the indication of the active DL BWP change as further described herein. The threshold may be a predefined value (such as, stored on the UE) or signaled to the UE by the base station. For example, if the last symbol of the PDCCH span of the DCI carrying the BWP change is no later than the last symbol of the PDCCH span of the CSI trigger DCI (in other words, the gap is less than or equal to zero symbols), the UE may determine the first occupation time or second occupation time according to the indication of the active DL BWP change as further described herein. Otherwise, the UE may not consider or ignore the active BWP change. That is, if the last symbol of the PDCCH span of the DCI carrying the BWP change is later than the last symbol of the PDCCH span of the CSI trigger DCI, the UE may not consider the active BWP change. The gap threshold between the BWP change indication and the CSI trigger state may enable the UE to consider cross-carrier scheduling that provides the BWP change or the CSI trigger state, for example, as described herein with respect to FIG. 7. In other aspects, the CPU occupancy may take into account the BWP change indication as further described herein, if the BWP change indication is in the same CORESET as the CSI trigger.

In aspects, determining the first occupation time may include determining, if CSI resources associated with the first CSI report are available according to the indication of the active DL BWP change (such as, the first BWP is active when the UE is scheduled to monitor the CSI resources for the first CSI report), that the first occupation time runs from a next time-domain resource (such as, a symbol) later than the CORESET until a last time-domain resource (such as, a symbol) of an uplink channel (such as, a PUSCH) carrying the first CSI report. Determining the first occupation time may include determining, if the CSI resources associated with the first CSI report are unavailable according to the indication of the active DL BWP change (such as, the first BWP is non-active when the UE is scheduled to monitor the CSI resources for the first CSI report), that the first number of CPUs is unoccupied and the first occupation time is unset, for example, as described herein with respect to FIG. 8. A number of CPUs being unoccupied may refer to a number of occupied CPUs for a CSI report being equal to zero. An occupation time being unset may refer to a UE or BS refraining to initiate an occupation time for the corresponding CPUs.

In some cases, the control signaling carrying the active BWP change may be received earlier than the control signaling carrying the CSI trigger state. In such a case, determining the first occupation time may include determining, if CSI resources associated with the first CSI report are available according to the indication of the active DL BWP change, that the first occupation time runs from a next time-domain resource later than a latter of the control signaling or the additional control signaling until a last time-domain resource of an uplink channel carrying the first CSI report. If the CSI resources associated with the first CSI report are unavailable according to the indication of the active DL BWP change, the UE may determine that the first number of CPUs is unoccupied and the first occupation time is unset, for example, as described herein with respect to FIG. 8.

In aspects, determining the second occupation time may include determining, if CSI resources associated with the second CSI report are available according to the indication of the active DL BWP change, that the second occupation time runs from a next time-domain resource later than the CORESET until a last time-domain resource of an uplink channel carrying the second CSI report. Determining the second occupation time may also include determining, if the CSI resources associated with the second CSI report are unavailable according to the indication of the active DL BWP change, that the second number of CPUs is unoccupied and the second occupation time is unset.

The occupation time may consider if the active BWP change is received earlier than the CSI trigger state. Determining the second occupation time may include determining, if CSI resources associated with the second CSI report are available according to the indication of the active DL BWP change, that the second occupation time runs from a next time-domain resource later than a latter of the control signaling or the additional control signaling until a last time-domain resource of an uplink channel carrying the second CSI report. If the CSI resources associated with the second CSI report are unavailable according to the indication of the active DL BWP change, the UE may determine that the second number of CPUs is unoccupied and the second occupation time is unset.

In some aspects, the CPU occupancy may be set for CSI reports regardless of the BWP active state, for example, as described herein with respect to FIGS. 9 and 10. In some cases, the CPU occupancy may be allocated aggressively running the entire CSI reporting timeline as described herein with respect to FIG. 9. For example, determining the first occupation time may include determining that the first occupation time runs from a next time-domain resource later than the control signaling (such as, a PDCCH carrying a CSI trigger state) until a last time-domain resource of an uplink channel carrying the first CSI report. Determining the second occupation time may include determining that the second occupation time runs from the next time-domain resource later than the control signaling until the last time-domain resource of the uplink channel carrying the second CSI report.

In other aspects, the CPU occupancy of a CSI report on a non-active BWP may be released if the UE does not receive an indication of an active BWP change earlier than the measurement resources for such a CSI report. For example, determining the first occupation time may include determining, if an indication of the active DL BWP change to the second BWP is sent to the UE, that the first occupation time runs from a next time-domain resource later than the control signaling triggering the first CSI report until a some time-domain resource earlier than a first time-domain resource of an uplink channel carrying the first CSI report.

The some time-domain resource may include various time-domain resources such as the first time-domain resource later than the CORESET on which the additional control signaling including the indication of active DL BWP change is received, the first time-domain resource of the CSI resource associated with the first CSI report, the last time-domain resource of the CSI resource associated with the first CSI report, the first time-domain resource when the second BWP is active.

Determining the second occupation time may include determining, if the indication of the active DL BWP change to the second BWP is not received earlier than a first time-domain resource of a CSI resource associated with the second CSI report, that the second occupation time runs from a next time-domain resource earlier than the control signaling until a last time-domain resource of the CSI resource. In other aspects, if the indication of the active DL BWP change to the second BWP is received earlier than the CSI resource associated with the second CSI report, the UE may determine that the second occupation time runs from a next time-domain resource later than the control signaling until a last time-domain resource of an uplink channel carrying the second CSI report.

In aspects, for CSI reports associated measurement resources on non-active BWPs, the CPU occupancy may start from when the non-active BWP is changed to an active BWP, for example, as described herein with respect to FIGS. 11 and 12. The operations 1300 may further include the UE receiving, from the base station, additional control signaling that includes the indication of the active DL BWP change indicating when the second BWP is active. In cases where the UE receives a CORESET including the CSI trigger state and active BWP change indication, determining the second occupation time may include determining, if the indication of the active DL BWP change to the second BWP is received before a first time-domain resource of a CSI resource associated with the second CSI report, that the second occupation time runs from a next time-domain resource later than a CORESET including the control signaling and the additional control signaling until a last time-domain resource of an uplink channel carrying the second CSI report.

In other aspects, for example, when the CSI trigger state and the active BWP change indication are sent in separate PDCCHs not in the same CORESET, determining the second occupation time may include determining, if the indication of active DL BWP change to the second BWP is received before a first time-domain resource of a CSI resource associated with the second CSI report, that the second occupation time runs from a next time-domain resource later than a latter of the control signaling or the additional control signaling until a last time-domain resource of an uplink channel carrying the second CSI report.

In aspects, the CPU occupancy for a CSI report may be delayed until a non-active BWP changes to an active BWP. For example, determining the second occupation time may include determining, if the indication of the active DL BWP change to the second BWP is received before a first time-domain resource of the CSI resource associated with the second BWP, that the second occupation time runs from a first time-domain resource later than the second BWP is active until a last time-domain resource of an uplink channel carrying the second CSI report.

In aspects, the UE may determine whether there is sufficient CSI computation time for CSI reports on a non-active BWP according to various UE CSI computation time criteria. In some aspects, the operations 1300 may further include the UE determining if a duration from a next time-domain resource later than the CORESET or latter of the control signaling or additional control signaling until the last time-domain resource of the uplink channel is less than or equal to a threshold of time-domain resources (such as, Z symbols). If the duration is less than or equal to the threshold, the UE may proceed with processing the CSI reports; otherwise, the UE may refrain from performing the CSI computations and not update CSI report for the base station.

In block 1306, the UE may take various actions based on the at least one occupation time. In some aspects, the UE may report, to the base station, CSI associated with first CSI report or the second CSO report based on whether a number of occupied CPUs is less than or equal to a threshold during the at least one occupation time. For example, if the number of occupied CPUs, taking into account the one or more CPUs associated with the first CSI report or the second CSI report, would exceed the threshold, the UE may refrain from reporting the first CSI report, second CSI report, or other scheduled CSI reports. In other cases, if the number of occupied CPUs, taking into account the one or more the CPUs associated with the first CSI report or the second CSI report, is less than or equal to the threshold, the UE may report the first CSI report or second CSI report.

Figure 14:
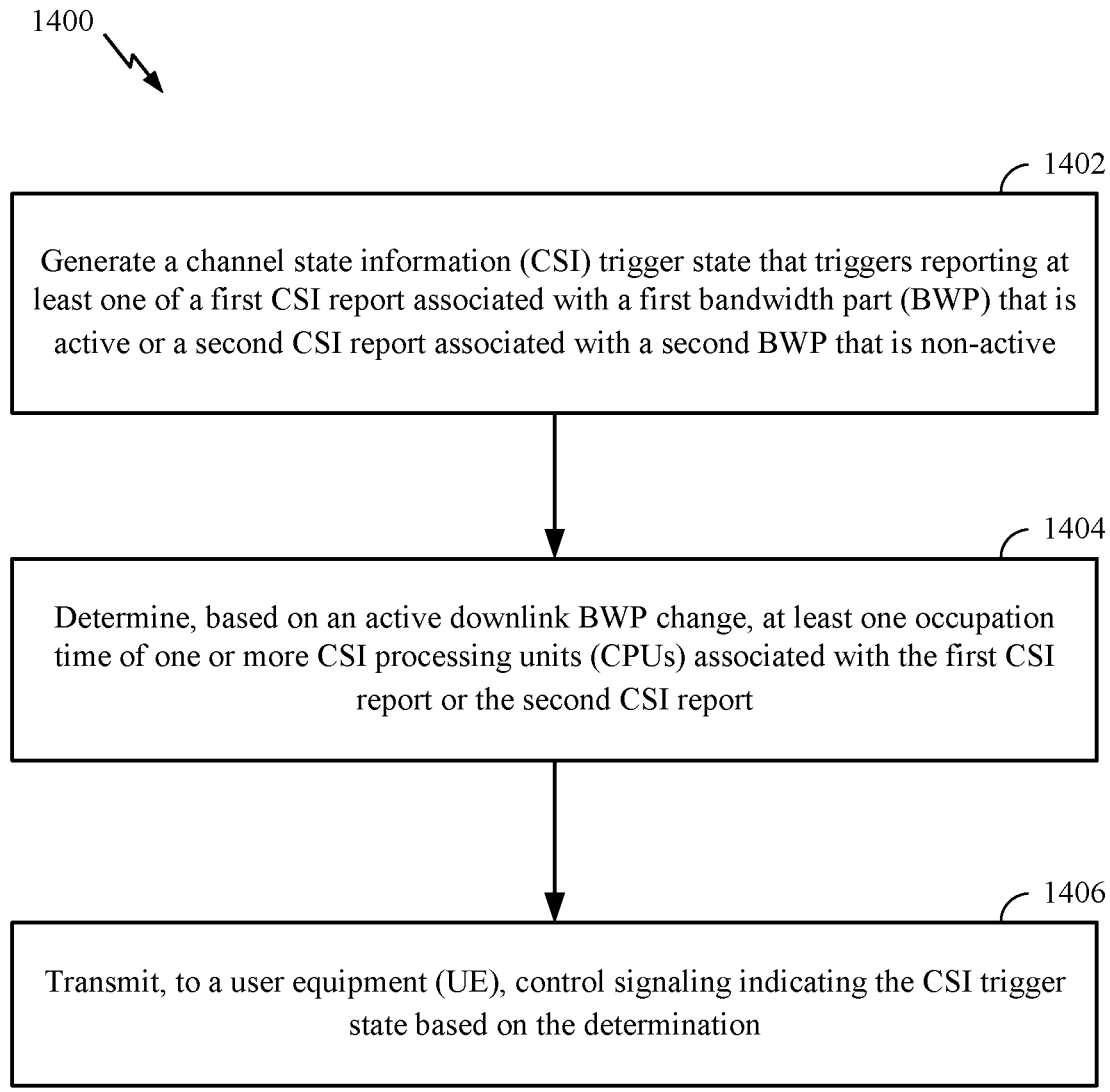
FIG. 14 shows a flowchart illustrating an example process for wireless communication (for example, by a BS), in accordance with some aspects of the present disclosure.

FIG. 14 shows a flowchart illustrating an example process 1400 for wireless communication, in accordance with some aspects of the present disclosure. The operations 1400 may be performed, for example, by a BS (such as, such as the BS 110a in the wireless communication network 100). The operations 1400 may be complimentary to the operations 1300 performed by the UE. Operations 1400 may be implemented as software components that are executed and run on one or more processors (such as, controller/processor 240 of FIG. 2). Further, the transmission and reception of signals by the BS in operations 1400 may be enabled, for example, by one or more antennas (such as, antennas 234 of FIG. 2). In some aspects, the transmission or reception of signals by the BS may be implemented via a bus interface of one or more processors (such as, controller/processor 240) obtaining or outputting signals.

The operations 1400 may begin, in block 1402, where the BS may generate a CSI trigger state that triggers reporting at least one of a first CSI report associated with a first BWP that is active or a second CSI report associated with a second BWP that is non-active. In block 1404, the BS determining, based on an active DL BWP change, at least one occupation time of one or more CPUs associated with the first CSI report or the second CSI report. In block 1406, the BS may transmit, to a UE (such as, UE 120a), control signaling indicating the CSI trigger state based on the determination.

The control signaling may include triggers for various CSI reports. For instance, the control signaling may trigger CSI reports that are only associated with active BWP(s), such as the first BWP. The control signaling may trigger CSI reports that are only associated with non-active BWP(s), such as the second BWP. In other cases, the control signaling may trigger CSI reports associated with a mix of active BWPs and non-active BWPs (such as, the first BWP and second BWP).

In aspects, a CSI report may occupy one or more CPUs depending on various factors, including the number of CSI-RS resources in a CSI resource set associated with the CSI report, the type of CSI report, and the CSI processing timing requirement, etc.

Determining at least one occupation time in block 1402 may include the BS determining, based on the indication of the active DL BWP change, at least one of a first occupation time of a first number of CPUs associated with the first CSI report or a second occupation time of a second number of CPUs associated with the second CSI report.

The operations 1400 may further include the BS transmitting, to the UE, DCI that includes the indication of the active DL BWP change indicating when the second BWP is active. For example, DCI format 1_1 (a DL resource grant) may include a BWP indicator field, and the UE may compare the indicated BWP identifier (Id) in the DL resource grant with the active DL BWP identifier to determine if the DCI indicates an active DL BWP change. For a TDD system, because DL and UL BWP are implicitly linked by the same BWP identifier, the BS may implicitly indicate an active DL BWP change by transmitting a DCI message having a format 0_1 (UL-grant) where the BWP indicator field indicates an active UL BWP change.

In some aspects, the CPU occupancy may take into account the BWP change indication if the PDCCH carrying the BWP change indication and the PDCCH carrying the CSI trigger are sufficiently close, for example, if the active BWP change indication is in the same CORESET as the control signaling that triggers CSI reports (such as, A-C SI trigger state). The BS may send an indication of the active DL BWP change in the same CORESET as the control signaling. For example, the operations 1400 may include the BS transmitting, to the UE, on a CORESET including the control signaling and additional control signaling that includes the indication of the active DL BWP change indicating when the second BWP is active. The additional control signaling may include a DCI message indicating a resource grant (such as, a DL or UL resource grant) on the second BWP (such as, a BWP identifier). In other cases, the BS may send the additional control signaling outside of the CORESET carrying the control signaling.

The BS may determine if a gap from a last time-domain resource (such as, a symbol) of a first downlink channel (such as, PDCCH) carrying the control signaling to a last time-domain resource (such as, a symbol) of a second downlink channel (such as, PDCCH) carrying the additional control signaling is less than or equal to a threshold (such as, 3 symbols). If the gap is less than or equal to the threshold, the BS may determine the first occupation time or second occupation time according to the active DL BWP change as further described herein. The threshold may be a predefined value (such as, stored on the UE) or determined by the BS and signaled to the UE. For example, if the last symbol of the PDCCH span of the DCI carrying the BWP change is no later than the last symbol of the PDCCH span of the CSI trigger DCI (in other words, the gap is less than or equal to zero symbols), the BS may determine the first occupation time or second occupation time according to the indication of the active DL BWP change as further described herein. Otherwise, the BS may not consider or ignore the active BWP change. That is, if the last symbol of the PDCCH span of the DCI carrying the BWP change is later than the last symbol of the PDCCH span of the CSI trigger DCI, the BS may not consider the active BWP change. The gap threshold between the BWP change indication and the CSI trigger state may enable the BS to consider cross-carrier scheduling that provides the BWP change or the CSI trigger state, for example, as described herein with respect to FIG. 7. In other aspects, the CPU occupancy may take into account the BWP change indication as further described herein, if the BWP change indication is in the same CORESET as the CSI trigger.

In aspects, determining the first occupation time may include the BS determining, if CSI resources associated with the first CSI report are available according to the indication of the active DL BWP change (such as, the first BWP is active when the UE is scheduled to monitor the CSI resources for the first CSI report), that the first occupation time runs from a next time-domain resource (such as, a symbol) later than the CORESET until a last time-domain resource (such as, a symbol) of an uplink channel (such as, a PUSCH) carrying the first CSI report. Determining the first occupation time may include the BS determining, if the CSI resources associated with the first CSI report are unavailable according to the indication of the active DL BWP change (such as, the first BWP is non-active when the UE is scheduled to monitor the CSI resources for the first CSI report), that the first number of CPUs is unoccupied and the first occupation time is unset, for example, as described herein with respect to FIG. 8.

In some cases, the control signaling carrying the active BWP change may be received earlier than the control signaling carrying the CSI trigger state. In such a case, determining the first occupation time may include determining, if CSI resources associated with the first CSI report are available according to the indication of the active DL BWP change, that the first occupation time runs from a next time-domain resource later than a latter of the control signaling or the additional control signaling until a last time-domain resource of an uplink channel carrying the first CSI report. If the CSI resources associated with the first CSI report are unavailable according to the indication of the active DL BWP change, the BS may determine that the first number of CPUs is unoccupied and the first occupation time is unset, for example, as described herein with respect to FIG. 8.

In aspects, determining the second occupation time may include determining, if CSI resources associated with the second CSI report are available according to the indication of the active DL BWP change, that the second occupation time runs from a next time-domain resource later than the CORESET until a last time-domain resource of an uplink channel carrying the second CSI report. Determining the second occupation time may also include determining, if the CSI resources associated with the second CSI report are unavailable according to the indication of the active DL BWP change, that the second number of CPUs is unoccupied and the second occupation time is unset.

The occupation time may consider if the active BWP change is received earlier than the CSI trigger state. Determining the second occupation time may include determining, if CSI resources associated with the second CSI report are available according to the indication of the active DL BWP change, that the second occupation time runs from a next time-domain resource later than a latter of the control signaling or the additional control signaling until a last time-domain resource of an uplink channel carrying the second CSI report. If the CSI resources associated with the second CSI report are unavailable according to the indication of the active DL BWP change, the BS may determine that the second number of CPUs is unoccupied and the second occupation time is unset.

In some aspects, the CPU occupancy may be set for CSI reports regardless of the BWP active state, for example, as described herein with respect to FIGS. 9 and 10. In some cases, the CPU occupancy may be allocated aggressively running the entire CSI reporting timeline as described herein with respect to FIG. 9. For example, determining the first occupation time may include determining that the first occupation time runs from a next time-domain resource later than the control signaling (such as, a PDCCH carrying a CSI trigger state) until a last time-domain resource of an uplink channel carrying the first CSI report. Determining the second occupation time may include determining that the second occupation time runs from the next time-domain resource later than the control signaling until the last time-domain resource of the uplink channel carrying the second CSI report.

In other aspects, the CPU occupancy of a CSI report on a non-active BWP may be released if the BS does not send an indication of an active BWP change earlier than the measurement resources for such a CSI report. For example, determining the first occupation time may include the BS determining, if an indication of the active DL BWP change to the second BWP is sent to the UE, that the first occupation time runs from a next time-domain resource later than the control signaling triggering the first CSI report until a specific time-domain resource earlier than a first time-domain resource of an uplink channel carrying the first CSI report. The specific time-domain resource may include various time-domain resources such as the first time-domain resource later than the CORESET on which the additional control signaling including the indication of active DL BWP change is received, the first time-domain resource of the CSI resource associated with the first CSI report, the last time-domain resource of the CSI resource associated with the first CSI report, the first time-domain resource when the second BWP is active.

Determining the second occupation time may include determining, if the indication of the active DL BWP change to the second BWP is not received earlier than a first time-domain resource of a CSI resource associated with the second CSI report, that the second occupation time runs from a next time-domain resource earlier than the control signaling until a last time-domain resource of the CSI resource. In other aspects, if the indication of the active DL BWP change to the second BWP is received earlier than the CSI resource associated with the second CSI report, the BS may determine that the second occupation time runs from a next time-domain resource later than the control signaling until a last time-domain resource of an uplink channel carrying the second CSI report.

In aspects, for CSI reports associated measurement resources on non-active BWPs, the CPU occupancy may start from when the non-active BWP is changed to an active BWP, for example, as described herein with respect to FIGS. 11 and 12. The operations 1400 may further include the BS transmitting, to the UE, additional control signaling that includes the indication of the active DL BWP change indicating when the second BWP is active. In cases where the BS sends a CORESET including the CSI trigger state and active BWP change indication, determining the second occupation time may include determining, if the indication of the active DL BWP change to the second BWP is received before a first time-domain resource of a CSI resource associated with the second CSI report, that the second occupation time runs from a next time-domain resource later than a CORESET including the control signaling and the additional control signaling until a last time-domain resource of an uplink channel carrying the second CSI report.

In other aspects, for example, when the CSI trigger state and the active BWP change indication are sent in separate PDCCHs not in the same CORESET, determining the second occupation time may include determining, if the indication of active DL BWP change to the second BWP is received before a first time-domain resource of a CSI resource associated with the second CSI report, that the second occupation time runs from a next time-domain resource later than a latter of the control signaling or the additional control signaling until a last time-domain resource of an uplink channel carrying the second CSI report.

In aspects, the CPU occupancy for a CSI report may be delayed until a non-active BWP changes to an active BWP. For example, determining the second occupation time may include determining, if the indication of the active DL BWP change to the second BWP is received before a first time-domain resource of the CSI resource associated with the second BWP, that the second occupation time runs from a first time-domain resource later than the second BWP is active until a last time-domain resource of an uplink channel carrying the second CSI report.

In aspects, the BS may determine whether there is sufficient CSI computation time for CSI reports on a non-active BWP according to various UE CSI computation time criteria. In some aspects, the operations 1400 may further include the BS determining if a duration from a next time-domain resource later than the CORESET or latter of the control signaling or additional control signaling until the last time-domain resource of the uplink channel is less than or equal to a threshold of time-domain resources (such as, Z symbols). If the duration is less than or equal to the threshold, the BS may send a CSI trigger state associated with such a CSI report; otherwise, the BS may refrain from send the CSI trigger state associated the such a CSI report.

In block 1406, the BS may transmit, to the UE, the control signaling based on whether a number of occupied CPUs is less than or equal to a threshold during the at least one occupation time. For example, if the number of occupied CPUs, taking into account the one or more CPUs associated with the first CSI report or the second CSI report, would exceed the threshold, the BS may refrain from transmitting the control signaling triggering the first CSI report, second CSI report, or other CSI reports until the UE has enough unoccupied CPUs to the perform the corresponding CSI computations. In other cases, if the number of occupied CPUs, taking into account the one or more CPUs associated with the first CSI report or the second CSI report, is less than or equal to the threshold, the BS may send the control signaling triggering the first CSI report or second CSI report.

Figure 15:
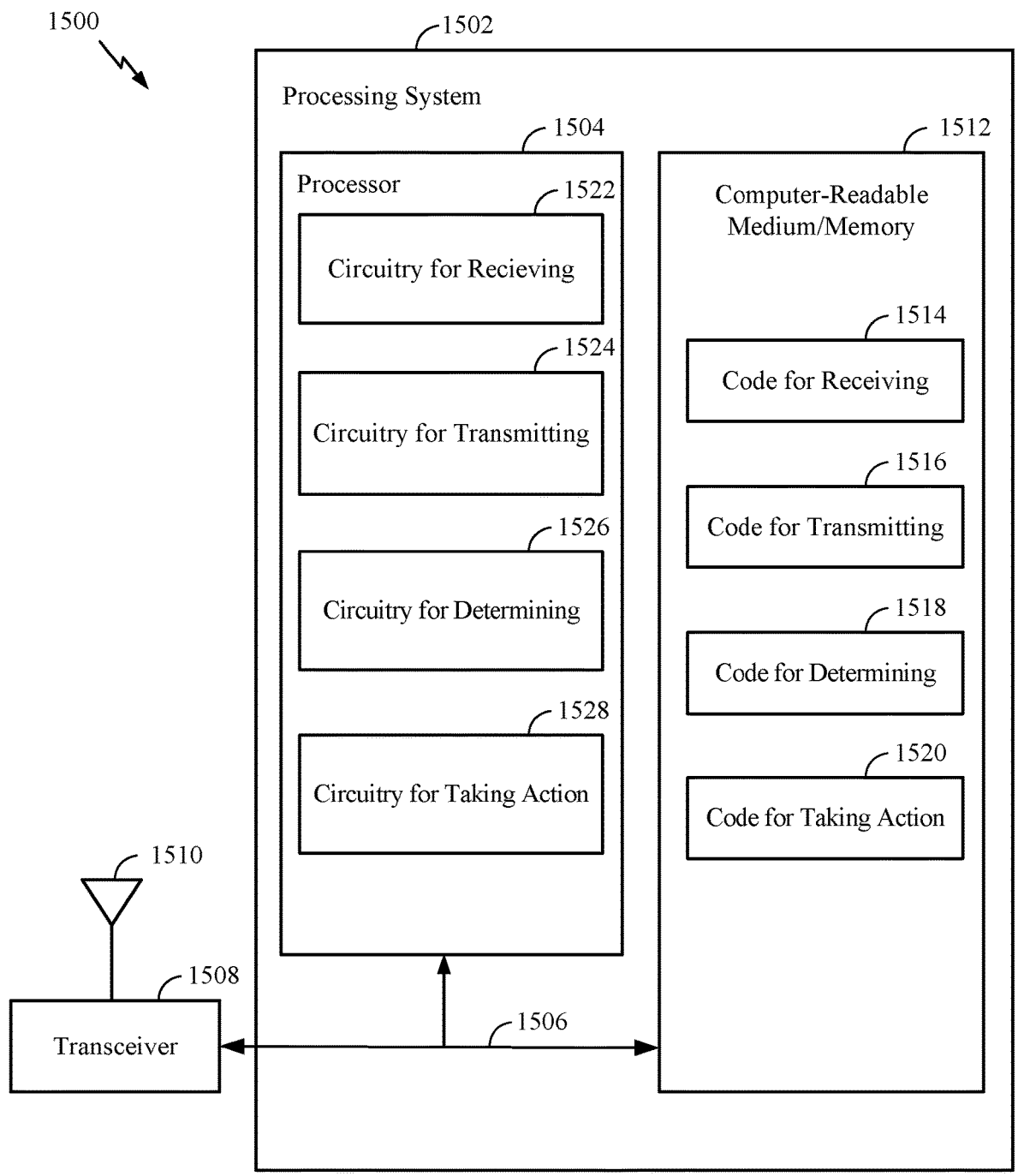
FIG. 15 illustrates a communications device (such as, a UE) that may include various components configured to perform operations for the techniques disclosed herein in accordance with aspects of the present disclosure.

FIG. 15 illustrates a communications device 1500 (such as, UE 120a) that may include various components (such as, corresponding to means-plus-function components) configured to perform operations for the techniques disclosed herein, such as the operations illustrated in FIG. 13. The communications device 1500 includes a processing system 1502 coupled to a transceiver 1508 (such as, a transmitter or receiver). The transceiver 1508 is configured to transmit and receive signals for the communications device 1500 via an antenna 1510, such as the various signals as described herein. The processing system 1502 may be configured to perform processing functions for the communications device 1500, including processing signals received or to be transmitted by the communications device 1500.

The processing system 1502 includes a processor 1504 coupled to a computer-readable medium/memory 1512 via a bus 1506. In some aspects, the computer-readable medium/memory 1512 is configured to store instructions (such as, computer-executable code) that when executed by the processor 1504, cause the processor 1504 to perform the operations illustrated in FIG. 13, or other operations for performing the various techniques discussed herein related to CSI processing criteria. In some aspects, computer-readable medium/memory 1512 stores code for receiving 1514, code for transmitting 1516, code for determining 1518, or code for taking action 1520. In some aspects, the processor 1504 has circuitry configured to implement the code stored in the computer-readable medium/memory 1512. The processor 1504 includes circuitry for receiving 1522, circuitry for transmitting 1524, circuitry for determining 1526, or circuitry for taking action 1528.

Figure 16:
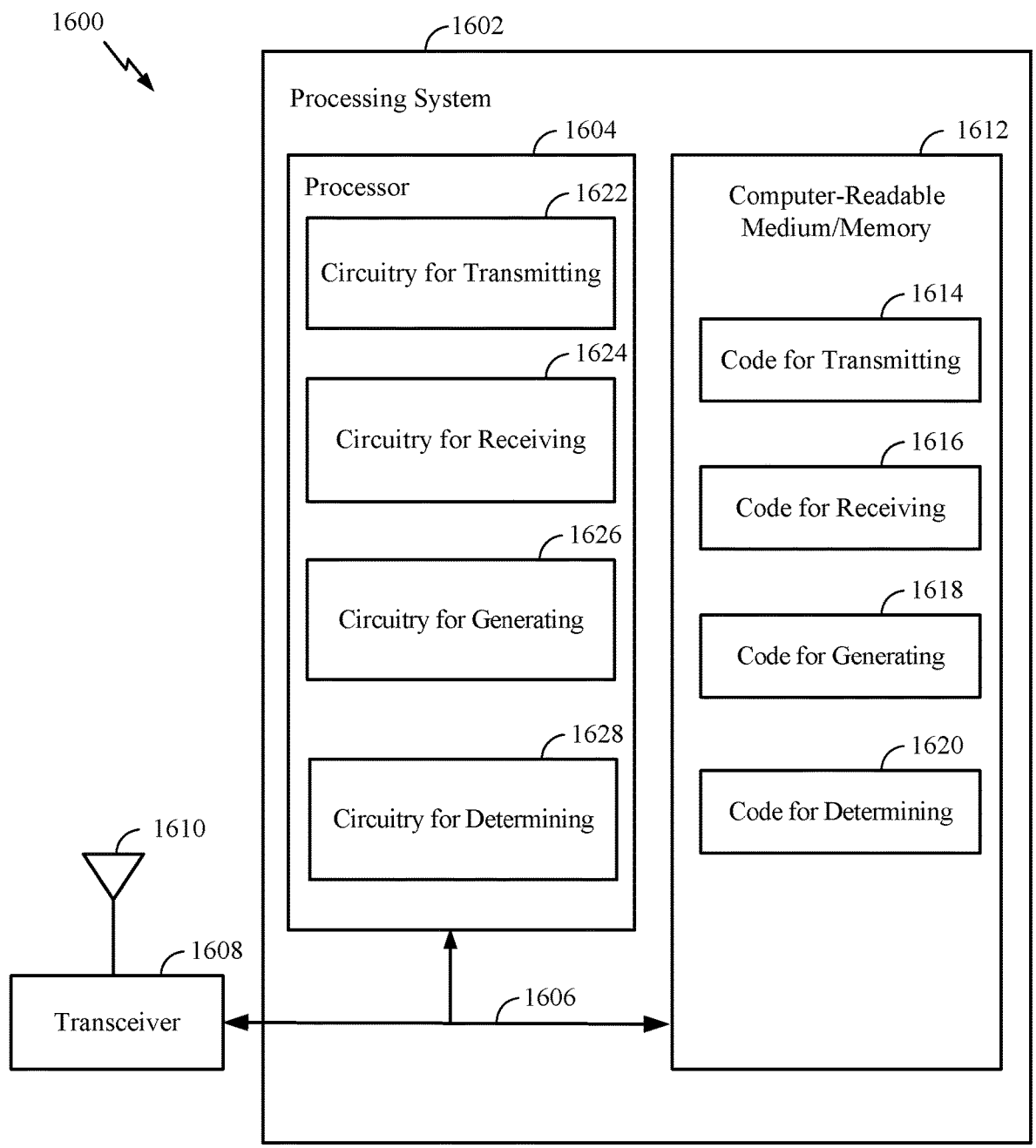
FIG. 16 illustrates a communications device (such as, a BS) that may include various components configured to perform operations for the techniques disclosed herein in accordance with aspects of the present disclosure.

FIG. 16 illustrates a communications device 1600 (such as, BS 110a) that may include various components (such as, corresponding to means-plus-function components) configured to perform operations for the techniques disclosed herein, such as the operations illustrated in FIG. 14. The communications device 1600 includes a processing system 1602 coupled to a transceiver 1608 (such as, a transmitter or receiver). The transceiver 1608 is configured to transmit and receive signals for the communications device 1600 via an antenna 1610, such as the various signals as described herein. The processing system 1602 may be configured to perform processing functions for the communications device 1600, including processing signals received or to be transmitted by the communications device 1600.

The processing system 1602 includes a processor 1604 coupled to a computer-readable medium/memory 1612 via a bus 1606. In some aspects, the computer-readable medium/memory 1612 is configured to store instructions (such as, computer-executable code) that when executed by the processor 1604, cause the processor 1604 to perform the operations illustrated in FIG. 14, or other operations for performing the various techniques discussed herein related to CSI processing criteria. In some aspects, computer-readable medium/memory 1612 stores code for transmitting 1614, code for receiving 1616, code for generating 1618, or code for determining 1620. In some aspects, the processor 1604 has circuitry configured to implement the code stored in the computer-readable medium/memory 1612. The processor 1604 includes circuitry for transmitting 1622, circuitry for receiving 1624, circuitry for generating 1626, or circuitry for determining 1628.

The techniques described herein may be used for various wireless communication technologies, such as NR (such as, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (such as 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (such as, several kilometers in radius) and may allow unrestricted access by UEs with service subscription. A pico cell may cover a relatively small geographic area and may allow unrestricted access by UEs with service subscription. A femto cell may cover a relatively small geographic area (such as, a home) and may allow restricted access by UEs having an association with the femto cell (such as, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (such as, a smart ring, a smart bracelet, etc.), an entertainment device (such as, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (such as, remote device), or some other entity. A wireless node may provide, for example, connectivity for or to a network (such as, a wide area network such as Internet or a cellular network) via a wired or wireless communication link. Some UEs may be considered Internet-of-Things (IoT) devices, which may be narrowband IoT (NB-IoT) devices.

Some wireless networks (such as, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (such as, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (such as, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (such as, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (such as, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

In some examples, two or more subordinate entities (such as, UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, or various other suitable applications. Generally, a sidelink signal may refer to a signal communicated from one subordinate entity (such as, UE1) to another subordinate entity (such as, UE2) without relaying that communication through the scheduling entity (such as, UE or BS), even though the scheduling entity may be utilized for scheduling or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps or actions may be interchanged with one another without departing from the scope of the claims. In other words, unless a specific order of steps or actions is specified, the order or use of specific steps or actions may be modified without departing from the scope of the claims.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

As used herein, the term "determining" encompasses a wide variety of actions. For example, "determining" may include calculating, computing, processing, deriving, investigating, looking up (such as, looking up in a table, a database or another data structure), ascertaining and the like. Also, "determining" may include receiving (such as, receiving information), accessing (such as, accessing data in a memory) and the like. Also, "determining" may include resolving, selecting, choosing, establishing and the like.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various operations of methods described above may be performed by any suitable means capable of performing the corresponding functions. The means may include various hardware or software component(s) or module(s), including, but not limited to a circuit, an application specific integrated circuit (ASIC), or processor. Generally, where there are operations illustrated in figures, those operations may have corresponding counterpart means-plus-function components with similar numbering.

For example, means for receiving may include a transceiver (such as, the transceiver(s) 254a-254r), an antenna (such as, the antenna 252), code for receiving (such as, the code for receiving 1514), circuitry for receiving (such as, the circuitry for receiving 1522) or a processor (such as, the controller/processor 280). Means for transmitting may include a transceiver (such as, the transceiver(s) 232a-232t), an antenna (such as, the antenna 234), code for transmitting (such as, the code for transmitting 1614), circuitry for transmitting (such as, the circuitry for transmitting 1622) or a processor (such as, the controller/processor 240). Means for determining may include a processor (such as, the controller/processor 280 or controller/processer 240), code for determining (such as, the code for determining 1518 or code for determining 1620), or circuitry for determining (such as, the circuitry for determining 1526 or circuitry for determining 1628). Means for taking one or more actions may include a processor (such as, the controller/processor 280), code for taking action (such as, the code for taking action 1520), or circuitry for taking action (such as, the circuitry for taking action 1528). Means for generating may include a processor (such as, the controller/processer 240), code for generating (such as, the code for generating 1618), or circuitry for generating (such as, the circuitry for generating 1626).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, such as, a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (such as, keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (such as, tangible media). In addition, for other aspects computer-readable media may comprise transitory computer-readable media (such as, a signal). Combinations of the above should also be included within the scope of computer-readable media.

Thus, some aspects may comprise a computer program product for performing the operations presented herein. For example, such a computer program product may comprise a computer-readable medium having instructions stored (or encoded) thereon, the instructions being executable by one or more processors to perform the operations described herein, for example, instructions for performing the operations described herein and illustrated in FIG. 13 or FIG. 14.

Further, it should be appreciated that modules or other appropriate means for performing the methods and techniques described herein can be downloaded or otherwise obtained by a user terminal or base station as applicable. For example, such a device can be coupled to a server to facilitate the transfer of means for performing the methods described herein. Alternatively, various methods described herein can be provided via storage means (such as, RAM, ROM, a physical storage medium such as a compact disc (CD) or floppy disk, etc.), such that a user terminal or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication, the apparatus comprising:
a memory storing computer executable code; and
one or more processors coupled to the memory, the processor being configured to execute the computer executable code and cause the apparatus to:
receive, from a base station via a first bandwidth part (BWP), control signaling that triggers reporting of at least one of a first channel state information (CSI) report associated with the first BWP or a second CSI report associated with a second BWP that is non-active;
receive, from the base station, additional control signaling including an indication of an active downlink (DL) BWP change indicating when the second BWP is active;
determine if a gap from a last time-domain resource of a first DL channel carrying the control signaling to a last time-domain resource of a second DL channel carrying the additional control signaling is less than or equal to a threshold;
determine, based on the gap being less than or equal to the threshold, at least one occupation time of one or more CSI processing units (CPUs) associated with the first CSI report or the second CSI report; and
take one or more actions based at least in part on the at least one occupation time.

2. The apparatus of claim 1, wherein the one or more processors are configured to cause the apparatus to determine, based on the indication of the active DL BWP change, at least one of: a first occupation time of a first number of CPUs associated with the first CSI report, or a second occupation time of a second number of CPUs associated with the second CSI report.

3. The apparatus of claim 1, wherein the additional control signaling comprises DL control information (DCI).

4. The apparatus of claim 3, wherein the control signaling comprises the DCI.

5. The apparatus of claim 1, wherein the one or more processors are configured to cause the apparatus to receive the additional control signaling, from the base station, on a control resource set (CORESET) including the control signaling.

6. The apparatus of claim 1, wherein the one or more processors are configured to cause the apparatus to report, to the base station, CSI associated with the first CSI report or the second CSI report.

7. The apparatus of claim 1, wherein the control signaling triggers reporting the second CSI report, and wherein the at least one occupation time is associated with the second CSI report.

8. An apparatus for wireless communication, the apparatus comprising:
a memory storing computer executable code; and
one or more processors coupled to the memory, the processor being configured to execute the computer executable code and cause the apparatus to:
generate a channel state information (CSI) trigger state that triggers reporting at least one of a first CSI report associated with a first bandwidth part (BWP) that is active or a second CSI report associated with a second BWP that is non-active;
transmit, to a user equipment (UE), additional control signaling including an indication of an active downlink (DL) BWP change indicating when the second BWP is active;
determine if a gap from a last time-domain resource of a first DL channel carrying the control signaling to a last time-domain resource of a second DL channel carrying the additional control signaling is less than or equal to a threshold;
determine, based on the gap being less than or equal to the threshold, at least one occupation time of one or more CSI processing units (CPUs) associated with the first CSI report or the second CSI report; and
transmit, to the UE, control signaling indicating the CSI trigger state based on the determination.

9. The apparatus of claim 8, wherein the one or more processors are configured to cause the apparatus to determine, based on the active DL BWP change, at least one of: a first occupation time of a first number of CPUs associated with the first CSI report, or a second occupation time of a second number of CPUs associated with the second CSI report.

10. The apparatus of claim 8, wherein the additional control signaling comprises DL control information (DCI).

11. The apparatus of claim 8, wherein the one or more processors are configured to cause the apparatus to transmit the additional control signaling, to the UE, on a control resource set (CORESET) including the control signaling.

12. The apparatus of claim 8, wherein the one or more processors are configured to cause the apparatus to transmit, to the UE, the control signaling based on whether a number of occupied CPUs is less than or equal to a threshold during the at least one occupation time.

13. The apparatus of claim 8, wherein the control signaling triggers reporting the second CSI report, and wherein the at least one occupation time is associated with the second CSI report.

14. A method of wireless communication by a user equipment, the method comprising:
receiving, from a base station via a first bandwidth part (BWP), control signaling that triggers reporting at least one of a first channel state information (CSI) report associated with the first BWP or a second CSI report associated with a second BWP that is non-active;
receiving, from the base station, additional control signaling including an indication of an active downlink (DL) BWP change indicating when the second BWP is active;
determining if a gap from a last time-domain resource of a first DL channel carrying the control signaling to a last time-domain resource of a second DL channel carrying the additional control signaling is less than or equal to a threshold;
determining, based on the gap being less than or equal to the threshold, at least one occupation time of one or more CSI processing units (CPUs) associated with the first CSI report or the second CSI report; and
taking one or more actions based at least in part on the at least one occupation time.

15. The method of claim 14, wherein determining the at least one occupation time comprises determining, based on the indication of the active DL BWP change, at least one of: a first occupation time of a first number of CPUs associated with the first CSI report, or a second occupation time of a second number of CPUs associated with the second CSI report.

16. The method of claim 14, wherein the additional control signaling comprises DL control information (DCI).

17. The method of claim 16, wherein the control signaling comprises the DCI.

18. The method of claim 14, further comprising receiving the additional control signaling, from the base station, on a control resource set (CORESET) including the control signaling.

19. The method of claim 14, wherein the taking one or more actions comprises reporting, to the base station, CSI associated with the first CSI report or the second CSI report.

20. The method of claim 14, wherein the control signaling triggers reporting the second CSI report, and wherein the at least one occupation time is associated with the second CSI report.

21. A method of wireless communication by a base station, the method comprising:
generating a channel state information (CSI) trigger state that triggers reporting at least one of a first CSI report associated with a first bandwidth part (BWP) that is active or a second CSI report associated with a second BWP that is non-active;
transmitting, to a user equipment (UE), additional control signaling including an indication of an active downlink (DL) BWP change indicating when the second BWP is active;
determining if a gap from a last time-domain resource of a first DL channel carrying the control signaling to a last time-domain resource of a second DL channel carrying the additional control signaling is less than or equal to a threshold;
determining, based on the gap being less than or equal to the threshold, at least one occupation time of one or more CSI processing units (CPUs) associated with the first CSI report or the second CSI report; and
transmitting, to the UE, control signaling indicating the CSI trigger state based on the determination.

22. The method of claim 21, wherein determining the at least one occupation time comprises determining, based on the active DL BWP change, at least one of: a first occupation time of a first number of CPUs associated with the first CSI report, or a second occupation time of a second number of CPUs associated with the second CSI report.

23. The method of claim 21, wherein the additional control signaling comprises DL control information (DCI).

24. The method of claim 21, wherein transmitting the additional control signaling, to the UE, is on a control resource set (CORESET) including the control signaling.

25. The method of claim 21, wherein the transmitting comprises transmitting, to the UE, the control signaling based on whether a number of occupied CPUs is less than or equal to a threshold during the at least one occupation time.

26. The method of claim 21, wherein the control signaling triggers reporting the second CSI report, and wherein the at least one occupation time is associated with the second CSI report.

* * * * *